United States Patent [19]
Theimer et al.

[11] Patent Number: 5,812,865
[45] Date of Patent: Sep. 22, 1998

[54] SPECIFYING AND ESTABLISHING COMMUNICATION DATA PATHS BETWEEN PARTICULAR MEDIA DEVICES IN MULTIPLE MEDIA DEVICE COMPUTING SYSTEMS BASED ON CONTEXT OF A USER OR USERS

[75] Inventors: Marvin M. Theimer, Mountain View; Michael J. Spreitzer, Tracy; Mark D. Weiser, Palo Alto; Richard J. Goldstein, San Francisco; Daniel C. Swinehart; William N. Schilit, both of Palo Alto; Roy Want, Mountain View, all of Calif.

[73] Assignee: Xerox Corporation, Stamford, Conn.

[21] Appl. No.: 607,254

[22] Filed: Mar. 4, 1996

Related U.S. Application Data

[63] Continuation of Ser. No. 161,730, Dec. 3, 1993, abandoned.

[51] Int. Cl.$^6$ ...................................................... G06F 15/00
[52] U.S. Cl. .............. 395/800; 395/200.04; 395/200.12; 395/806; 379/93; 379/88
[58] Field of Search ............................... 395/800, 200.01, 395/154, 200.04, 200.12, 806; 455/608; 379/95, 88, 93

[56] References Cited

U.S. PATENT DOCUMENTS

| | | | |
|---|---|---|---|
| 4,217,588 | 8/1980 | Freeny, Jr. | 342/458 |
| 4,275,385 | 6/1981 | White | 340/825.49 |
| 4,303,904 | 12/1981 | Chasek | 235/384 |

(List continued on next page.)

FOREIGN PATENT DOCUMENTS 2230365  10/1990  United Kingdom .

OTHER PUBLICATIONS

Samuel Sheng et al., "A Portable Multimedia Terminal," 1992, pp. 64–75.

Ian D. Wilson, "Recent Advances from Olivetti Research," Sep. 1992, pp. 711–714.

Timothy Kwok, "Communications Requirements of Multimedia Applications: A Preliminary Study," Feb. 1992, pp. 138–142.

(List continued on next page.)

*Primary Examiner*—Alyssa H. Bowler
*Assistant Examiner*—John Follansbee
*Attorney, Agent, or Firm*—R. Christine Jacobs; Tracy L. Hurt

[57] ABSTRACT

The present invention describes a system of multiple devices and multiple users, wherein the identity and location of each device and user may be known to the system. A method is described for establishing media connections between at least a first user and a second user based on the context of the system and the environment of the particular device, computing devices, or users. The system receives a media connection request from the first user, including information indicating the first user preferences for media, and identifies the intended recipient user or users. The location and media devices in proximity to each of the users is determined, and the preset profiles and policies of the users involved are determined. Each user may specify acceptable media connections and contextual attributes. When the contextual attributes and acceptable media connections for each user are consistent, media device communications paths are established.

6 Claims, 19 Drawing Sheets

U.S. PATENT DOCUMENTS

| | | | |
|---|---|---|---|
| 4,601,064 | 7/1986 | Shipley | 359/172 |
| 4,649,533 | 3/1987 | Chorley et al. | 370/400 |
| 4,882,681 | 11/1989 | Brotz | 395/753 |
| 4,912,471 | 3/1990 | Tyburski et al. | 342/42 |
| 4,952,928 | 8/1990 | Carroll et al. | 340/825.54 |
| 5,027,314 | 6/1991 | Linwood et al. | 364/460 |
| 5,068,916 | 11/1991 | Harrison et al. | 455/39 |
| 5,099,346 | 3/1992 | Lee et al. | 359/118 |
| 5,119,104 | 6/1992 | Heller | 342/450 |
| 5,146,488 | 9/1992 | Okada et al. | 379/88 |
| 5,157,660 | 10/1992 | Kuwahara et al. | 370/314 |
| 5,159,592 | 10/1992 | Perkins | 370/338 |
| 5,181,200 | 1/1993 | Harrison | 370/468 |
| 5,208,745 | 5/1993 | Quentin et al. | 364/188 |
| 5,210,824 | 5/1993 | Putz et al. | 395/785 |
| 5,335,276 | 8/1994 | Thompson et al. | 380/21 |
| 5,402,469 | 3/1995 | Hopper et al. | 379/93 |

OTHER PUBLICATIONS

Weiser, M. The Comuter for the 21st Century. Scientific American. vol. 265, No. 3, Sep. 1991, pp. 94–95, 908–102 & 104.

Kleiner, A. The Ultimate Control Chip the Programable World. Popular Science. May 1992. pp. 90–95.

Schilit, B. N.; Adams, N.; Gold, R.; Tso, M. M.; Want, R. The Parctab Mobile Computing System. Parc Papers at WWOS–IV, 1993 IEEE and Xerox. pp. 1–6.

Weiser, M. Some Computer Science Issues in Ubiquitous Computing. Communications of the ACM. Jul. 1993, vol. 36, No. 7, p. 84.

Dallas Semiconductor 1990–1991 Product Data Book, p. 837, Jul. 5, 1990 and p. 838, May 23, 1990.

SPECIFYING AND ESTABLISHING COMMUNICATION DATA PATHS BETWEEN PARTICULAR MEDIA DEVICES IN MULTIPLE MEDIA DEVICE COMPUTING SYSTEMS BASED ON CONTEXT OF A USER OR USERS

This is a continuation, of application Ser. No. 08/161,730, filed Dec. 3, 1993, now abandoned.

CROSS REFERENCE TO OTHER APPLICATIONS

The subject matter of the present invention is related to the subject matter of concurrently filed, commonly assigned U.S. patent applications having the following serial numbers and titles: Ser. No. (Attorney Docket No. D/93335), "SELECTION, CONTROL AND OWNERSHIP OF PARTICULAR DEVICES IN A MULTIPLE COMPUTER SYSTEM BASED ON CONTEXT AND ENVIRONMENT IN PROXIMITY TO A USER OR DEVICE," Ser. No. (Attorney Docket No. D/93336), "SELECTIVE DELIVERY OF ELECTRONIC MESSAGES IN A MULTIPLE COMPUTER SYSTEM BASED ON CONTEXT AND ENVIRONMENT OF A USER," and Ser. No. (Attorney Docket No. D/93691), "PERSONAL PRIVACY FOR MOBILE USERS IN DISTRIBUTED COMPUTING ENVIRONMENTS THAT SUPPORT LOCATION SENSITIVE APPLICATIONS," each of which are hereby incorporated by reference herein.

FIELD OF THE INVENTION

The present invention relates to control by a user of particular devices and activities in a multiple computer system based upon the current location and surrounding environment, including computing devices, of the user. More specifically, the invention relates to techniques for determining and implementing selected connections over a variety of media devices for multiple users, based on the current context and connection policies of the users involved.

BACKGROUND OF THE INVENTION

The introduction of computer networks and personal computing has forever changed users' expectations of what computer systems can accomplish. Individual users no longer expect to travel to a particular location to have their processing needs met. Instead, individuals expect to have sufficient computing power sitting on their desk to get the job done; or, at least, to have their personal computers networked to sufficient resources remote from their location to accomplish the task.

Attempts have been made to improve the "user-friendliness" of such personal computers, including the development of "window" systems to give users the illusion of working from their desktop electronically. This metaphor suffers, however, from the size limitation of the usual monitor screen for personal computers—no one would ever think of using an actual desktop only nine inches high by eleven inches wide. Personal computers remain static objects commanding the attention of users.

The notion of a computing environment in which computers themselves disappear into the background was raised by Mark Weiser, "The Computer for the 21st Century," Scientific American, September 1991. Two issues of crucial importance to transmission and display of information in such a "ubiquitous" computing environment are location and number of devices.

Weiser postulates a world in which there are many computing and computer-controlled devices surrounding each user all the time. In one example of such a system, he describes devices ranging from small computational devices called "Tabs"—inch-scale computers which are networked via wireless links—to yard-scale displays that may be used as electronic blackboards called "Board," that may cover the entire wall of a room.

Users may also wear "Active Badges," credit-card-sized devices that emit an infrared identification signal that can be sensed by receivers placed in each room of a building, thereby allowing detection of where each user is currently located. Active Badges can also be attached to other moving objects, such as portable printers and copiers.

Also discussed by Weiser at page 99 are "Pads," scrap-paper-like, notebook-sized computers that have no individualized identity or ownership. Weiser postulates that in the future there will be many Tabs and Pads per person, just as today there are many paper notebooks and stick-on notes per person. Consequently, users will interact with many different devices, both serially and in parallel, during the course of their daily lives.

"Guest" Tabs or Badges, and "scrap" Pads are devices not owned by any particular user. Instead, they are available—perhaps at the entrance to a building in the case of guest Badges, or in meeting rooms in the case of Tabs and Pads—for use by whoever picks them up. Picking up an Active Badge might involve checking it out from building security so that its association with a particular user can be registered with the system.

In the environment described in Weiser, specific actions may be taken by computers based on knowledge of location. For example, a Board may be configured as a public information bulletin board, its display information attuned to the people reading it. Room audio amplification or lighting may be controlled according to the desires of the people using Tabs or Pads in the room at that moment. Remote actions may be triggered by a user's presence at a location, such as a login procedure started when a user enters his or her office.

Jock Friedly, in "The Office of the 21st Century," Palo Alto Weekly, May 6, 1992, further describes a ubiquitous computing environment including Tabs and Active Badges which broadcast signals that may be tracked throughout the computing environment. Badges indicate where a person is so that phone calls, for example, may be forwarded to a user's location.

In a ubiquitous computing environment such as described by Weiser, users may further desire different automatic actions to be made by the system based on the context surrounding them. Some actions should only take place under controlled conditions. The environment or context of a user may affect operations the user might wish nearby computing systems to perform. For example, a user in a private meeting may not wish to have phone calls forwarded to that location. A message that is private may be displayed on a user's private Pad, but probably not on a public Board.

Similarly, a particular computing device may respond to users in different ways depending on the environment and context. For example, if one user walks into an unoccupied room, each computing device in that room may temporarily assign some measure of ownership control of itself or its resources to that user. When a second user enters the same room some, all, or none of the computing devices may allow the second user ownership rights, depending on the context and environment.

As described in Weiser, a user may be able to migrate any window that may appear on a workstation screen onto a Tab, Pad or Board. This allows users ongoing use of different I/O devices to interact with their electronic data and applications. Which devices will be used will depend on the circumstances of the user. In addition, more than one device might be used to interact with the system at the same time. For example, a user might keep several Pads on his or her desk, and migrate "secondary" applications, such as system status monitors, from a workstation screen onto those Pads. This would free up the workstation screen for use by "primary" applications, such as word processors and spread sheets. Just as today people spread out papers across their entire desks, so too might the user of tomorrow spread out work onto multiple electronic screens, be they Tabs, Pads, Boards, or workstations.

When a user goes to a meeting in another room, the user may take along one of those screens, or may choose to migrate the contents of one or more screens onto the I/O devices available in the meeting room, such as a Board, or one of several scrap Pads in the room.

Such a ubiquitous environment should enable users to make better use of their time and space. For example, some methods users employ to remind themselves of events— notes, pagers, beeping wristwatches, electronic calendars— cannot support automatic message delivery to a remote system, and cannot issue special messages tailored to the physical location and environment of the particular user.

Although there may be several ways to support a "ubiquitous computing" environment to accommodate the entire range of mobility required for ubiquitous computers, a preferred implementation is a network that allows "wireless" communication with mobile devices. To date, many "wireless" networks have already been designed—the most notable, perhaps, being the cellular telephone network. Wireless network systems are generally concerned with the physical layer of the network, and more specifically, with methods of transferring the communication support for a mobile unit from one base station to another. These issues may be classified as problems in "communication continuity." Communication continuity is concerned primarily with mechanisms for providing a continuous pathway for data between two or more units, at least one such unit being mobile, and for reestablishing a data pathway in the event of an unwanted disruption. By contrast, "processing continuity" relates to maintaining a current and proper processing context between two units.

A system for maintaining communication and processing continuity between a mobile processing unit and remotely resident applications is described in coassigned, copending patent application (Attorney Docket No. D/93307), entitled A METHOD AND SYSTEM FOR MAINTAINING PROCESSING CONTINUITY TO MOBILE COMPUTERS IN A WIRELESS NETWORK, filed Aug. 30, 1993 by Want et al., incorporated herein by reference. The system includes a network backbone, at least one stationary processor coupled to the backbone, and at least one transceiver coupled to the backbone. The transceivers are configured to communicate with the mobile unit through a wireless medium. Mobile units intermittently communicate with applications. The system employs a process that is dedicated to handling all communications between its associated mobile unit and applications. This process is responsible for the scheduling of communications sessions with the mobile unit.

One aspect of the present invention is the ability to provide a system in which actions of the system are initiated or triggered based on the context (for example, the location of the user or other users; the time of day) and the environment (for example, the user's location, nearby computing devices available) in proximity to the user.

Another aspect of the invention provides a system in which media data paths between users may be selected depending upon the context or state of the user or users. Furthermore, appropriate media devices for particular actions are selected based on the environment in proximity to the user, the context of the system, and the users' preferences in the present context.

In order to carry out these and other related functions, the system may have knowledge not only of users, machines, and computing devices, but of the context and environment that the users and devices are operating in. The system may know, for example, the physical location of a user, what computing devices are available at that location, what other users may be in close proximity to the user. The system may further provide processing continuity over a range of locations. For particular operations, the system may be able to discern predefined control variables, and may be sensitive to the context of certain actions.

SUMMARY OF THE INVENTION

In a system of multiple devices and multiple users where each device and user is represented by an electronic agent whereby the identity and location of each device and user may be known to the system, a method is described for establishing media connections between at least a first user and a second user based on the context of the system and the environment of the particular device, computing devices, or users. The system receives a media connection request from the first user, including information indicating the first user preferences for media, and identifying the intended recipient user or users. A location service is used to determine the locations of the users and media devices in proximity to each of the users. The profiles and policies of the users are determined. A first media device in close proximity to the first user is selected based upon the first user's profile properties and the media connection request, and a second media device in close proximity to the second user is selected based upon the context of the system, the second user's profile properties and the media connection request, and a connection is established between the first and second media devices.

The following description, the drawings and the claims further set forth these and other objects, features and advantages of the invention.

DETAILED DESCRIPTION

A. General System Architecture

Figure 1:
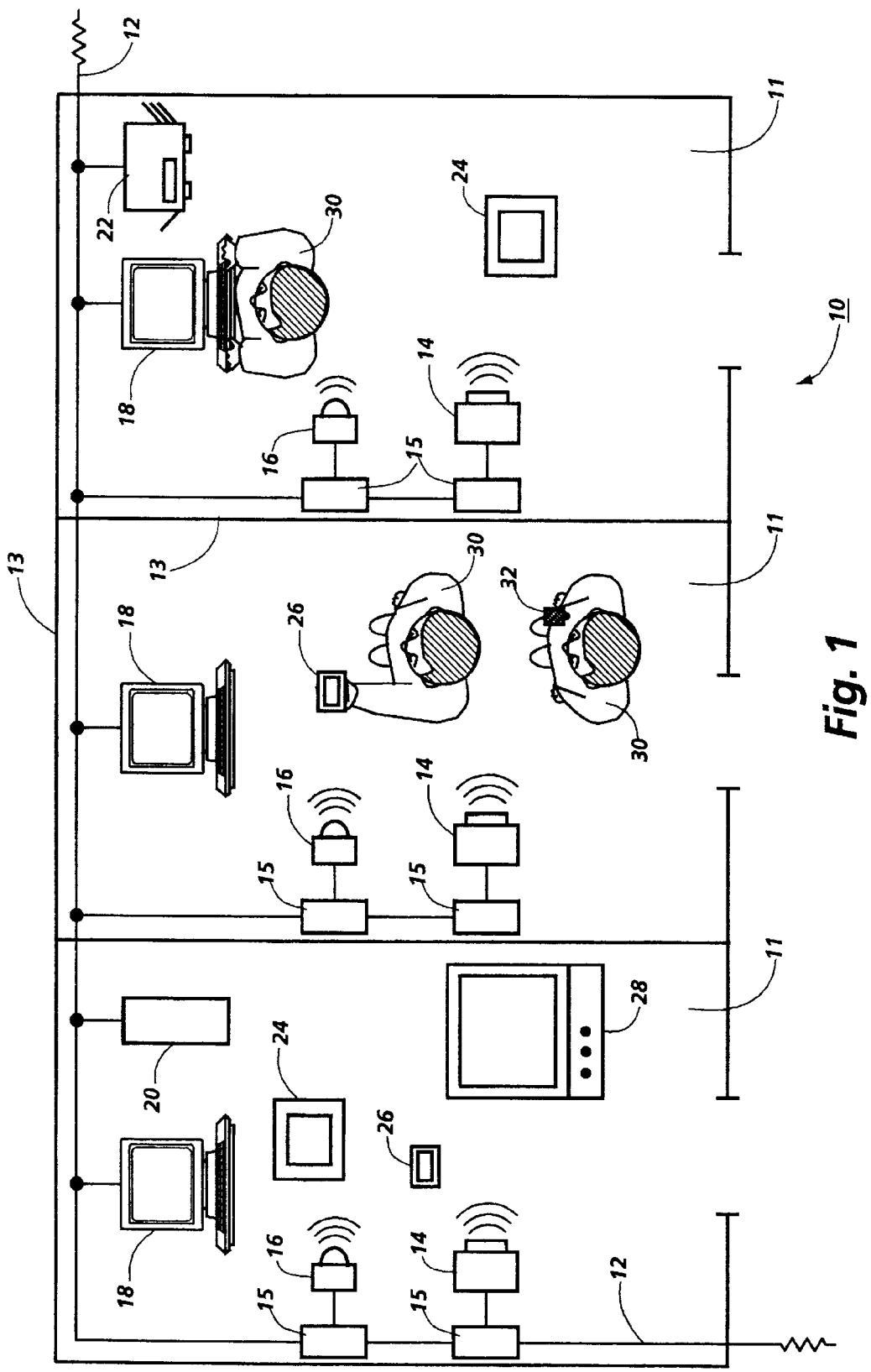
FIG. 1 shows an office environment configured to support a "ubiquitous computing" system.

FIG. 1 shows an office environment 10 configured to support a "ubiquitous computing" system. Components that might be found in such a system comprise hardwired network backbone 12, radio and infrared transceivers 14 and 16 respectively, workstation 18, file server 20, printer 22 and various mobile units 24, 26 and 28, and user 30.

Network backbone 12 provides high bandwidth communications between the various communication and computing devices. In the present embodiment, a 10 Mbps Ethernet provides the basic infrastructure. It will be appreciated that although any network architecture may suffice for the backbone, it is desirable that the bandwidth be wide enough to provide suitable performance to support a desired maximum number of devices.

Components of this system may be properly classified as either "stationary" or "mobile." Stationary components are generally hardwired to network backbone 12. Such components comprise workstation 18, file server 20 and printers 22, and the like. It will be appreciated that other networkable components may be connected to the infrastructure depending upon the needs of the office.

Mobile communication and computer units connect to backbone 12 via radio and infrared transceivers 14 and 16 respectively. One advantage of using infrared as a medium is reuse of frequencies. Walls 13 are essentially opaque to infrared transmission. Thus, infrared transmissions in one room do not interfere with infrared transmissions in another. Individual rooms 11 are termed communication "cells" because of this effective partitioning. This useful property allows the reuse of the infrared bandwidth for each cell in the workplace. It will be appreciated that the use of infrared as a medium for wireless communication is well known in the art. Cell-based communication further allows determination of a person's location to the granularity of the cell size. That is, because the communication system must know how to route communications to the correct cell for a particular person or device, it also must know that person's or device's location, to the accuracy of the cell size.

A similar communications partitioning is possible with a single radio frequency if the "near field" components produced by an antenna are used to couple the mobile units to the network. The term "near field" describes those field components of an energized antenna that do not give rise to propagating waves. The use of near field communication is disclosed in copending, coassigned U.S. patent application Ser. No. 07/984,821 entitled WIRELESS COMMUNICATIONS USING NEAR FIELD COUPLING, filed Dec. 3, 1992 by Richley et al., incorporated herein by reference.

Although only radio and infrared transmission are employed for wireless communication in the presently preferred embodiment, it will be appreciated that other types of electromagnetic and acoustic transmission might be suitable. Additionally, it will be appreciated that multiple frequencies may be employed to partition the communication space into non-interfering cells.

Communications facilities for the system of the present invention may be provided by other communications technologies. However, there must still be a facility for locating moving users and devices. For example, if people wear Active Badges which provide their location, then the Badge system will be able to locate them. Cellular phones or wide-area radio technologies may then be used to perform communications.

Each transceiver 14 or 16 in the described embodiment is connected to a network 12 through a base station, or gateway computer 15 which performs translation between the wireless communication from the transceiver and the communication packets sent over the network 12.

Tabs 26 and Pads 24 are mobile units that connect with the network through the wireless media. Boards 28 may also provide a means for computer system communications. A user 30 may further have on an Active Badge 32. Tab 26 is a small stylus-based mobile computer. Tab 26 may be carried by a user 30 throughout the workplace, may be assigned to a particular user, and further may identify that user to sensing devices. Functionally, Tab 26 may be a simple device. Speed and memory capacity requirements are very modest, thus enabling these devices to be very small and consume little power. As a result, Tabs 26 are very portable. Clearly, other devices, including other mobile devices, with at least the ability to perform simple communications with the system and to interact with the user and display messages may be used to perform the techniques herein described, as well. Pads, for example, may be used and, being more powerful, may further provide additional applications capabilities to the user.

Tab 26 may also report events generated by its user in response to information displayed on its screen. These events may be triggered by pressing mechanical buttons on the Tab, or by pressing a stylus against a pressure sensitive display, or by other suitable user interface mechanisms.

As a user 30 with a Tab 26 may move from communication cell to communication cell, Tab 26 may be periodically disconnected from the network. Such disconnection may happen for a number of reasons, including moving the Tab into a communication "dead zone" where no transceiver may maintain contact, or by a failure of the Tab itself, such as the discharging of its battery, or the user powering off the Tab, or the like.

When the cause of disconnection is removed, Tab 26 reconnects to the network. Thus, as user 30 moves into communication proximity with another sensor in a different cell (or with the original sensor at a different time), Tab 26 reestablishes connection with the network through its regular broadcasts or by a user triggered packet. It will be appreciated that other schemes for maintaining regular contact with the network exist. For example, the infrared transceiver could poll mobile units within its cell.

Figure 2:
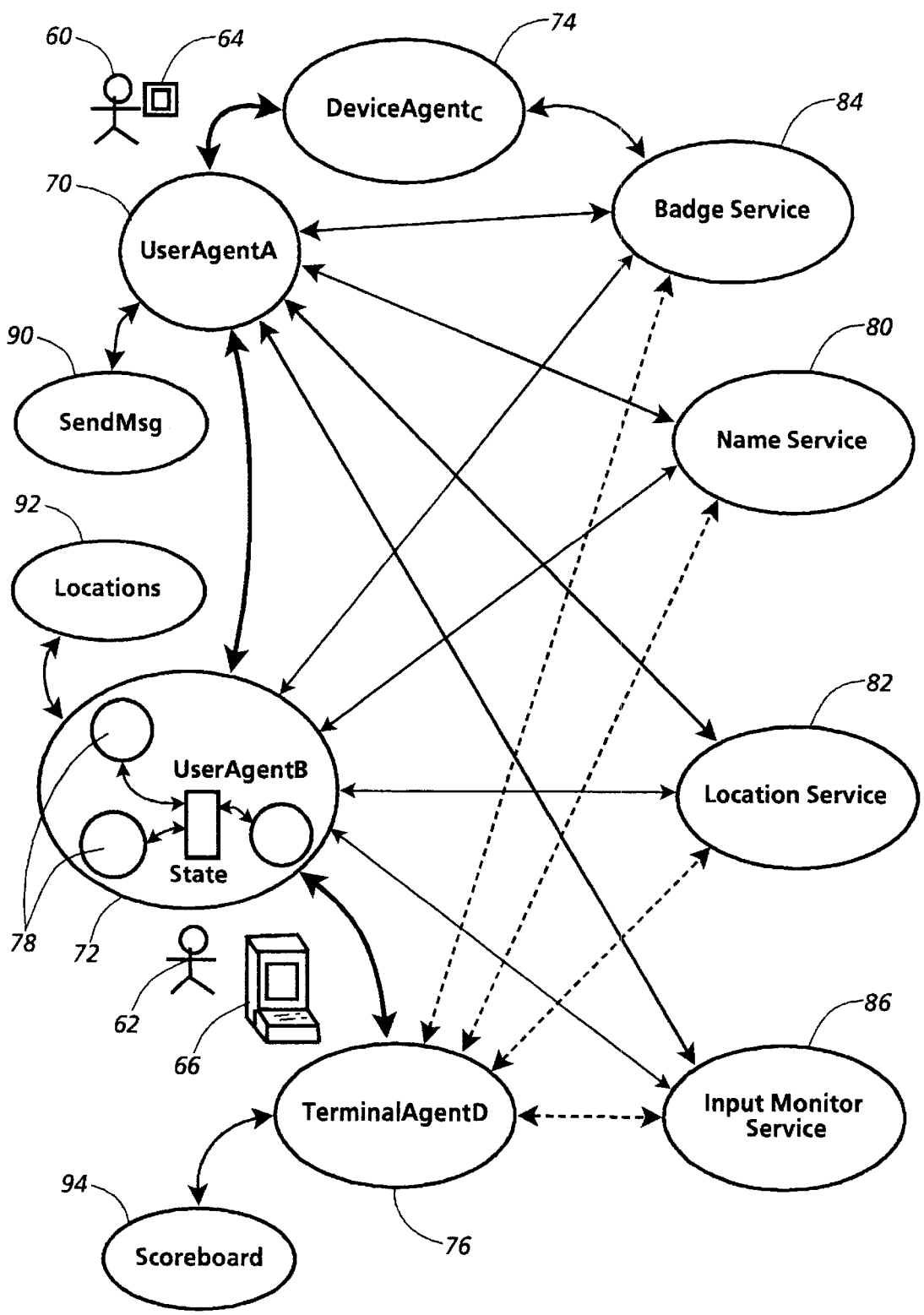
FIG. 2 shows a high level diagram of the system architecture of the system elements and communications paths between the system, users and devices used to determine the context of the system.

FIG. 2 shows a high level diagram of the system architecture of the system elements and communications paths between the system, users and devices used to determine the context of the system. Note that FIG. 2 is meant to be illustrative of the capabilities of the system, and not all possible communications paths are shown among the processes shown in the figure. The "context" includes the state of the system: positional information about users and devices, the states of users and devices in the system, interaction policies, and the status of applications, devices, and users in the system. A "user," for the purposes of the discussion below, is a human who interacts, implicitly or explicitly, with the resources of the system. A "device" is any other entity with the ability to computationally interact with the system, that is, power to accept and respond to computational commands. A device may include a computer workstation or a small portable computing device as described above. Each device must present consistent characterizing information in a format computationally recognizable to any potential client of that device.

Communication between processes is described herein in terms of Remote Procedure Calls (RPC). Techniques for implementing systems using RPCs are well-known in the art. Although clearly other means of communication may be available to implement the system herein described, interprocess communication via RPC will be assumed for the purposes of generally describing the preferred embodiment of the ubiquitous system.

The present system as described employs a distributed file system to store persistent data of the system. Clearly other means of storing persistent data may also be available in the system. Each agent must, however, employ some file system for storing persistent data that is available to at least that agent. Name Service 80 provides a place where processes can register themselves to be found by other interested parties, based on knowledge of a particular name or of particular attribute information. All objects, either users or devices, that wish to be identifiable by name register themselves in Name Service 80. It is much like a telephone book in its intended purpose. In the present embodiment, a registration contains two things: an RPC address that can be used to contact the process for further interactions, and a list of (key, value) pairs that describes the registered process to greater or lesser degree. Keys and values are typically text strings, although more complex data types may be used for values (e.g., multi-field records). Keys are well-known text strings that can be used to characterize the meaning of their associated value fields. One key value that is commonly present in a registration is a "name" key, whose associated value is typically a known unique name that a process can be associated with. Using the analogy of a telephone book, the "name" key corresponds to the name field in the telephone white pages and the RPC address corresponds to the phone number. Other (key, value) attribute information in a registration corresponds to the information commonly found in the yellow pages of a phone book. For example, the key "type" might characterize what kind of functionality the process associated with a registration is willing to offer (e.g., UserAgent or TerminalAgent, discussed below).

Each physical object—users, devices, or groups of devices (such as the input and output devices that comprise a computer terminal)—is represented in the system by a unique "agent." For example, each user is represented in the system by a unique "UserAgent." A user's agent is under control of the user, and interacts with the rest of the system as an electronic proxy for that user. Personal information about a user is primarily collected by, and primarily resides in, the user's agent. This information may include: 1) relatively static information, such as preferences and policies, 2) modestly dynamic information, such as personal calendar or datebook information, and 3) very dynamic information, such as current location and activity. A user's agent controls access to the user's personal information, as prescribed by the personal preferences and policies known to that agent, and as appropriate to the current circumstances as known by that agent. Other system elements have only such access as is granted by the user's agent.

Some devices are stationary objects that simply receive information and do not otherwise interact with the objects around it. Other devices may collect or send information, provide services, or in other ways interact with users and devices in the system. Each electronic device or group of devices that interacts with the "world" is represented in the system by a unique "DeviceAgent." That agent collects and manages information about, and exercises direct control over, the device. Other system elements do not interact directly with the device, but indirectly through the device's agent. Information that the agent may manage and collect includes things like the capabilities of the device (e.g., if it has a display, and whether or not that display is color), the current state of the device, and possibly the ownership state of the device (i.e., who may request operations on it). In FIG. 2, User 60 is represented in the system by UserAgent$_A$ 70. Likewise user 62 is represented by UserAgent$_B$ 72. Tab 64 is represented by a specialized device agent TabAgent$_C$ 74, and workstation 66 is represented by a device agent known as a terminal agent, TerminalAgent 76. Agents may consist of several modules 78, some of which perform system infrastructure functions, and some of which are responsible for implementing the agent's responsibilities for specific applications or performing specific operations. An object's "characterizing information," how it is described to the system, is maintained and controlled by that object's agent. Both user agents and device agents will be discussed in more detail below.

User agents, which will be discussed in more detail in relation to FIGS. 3 and 4, may employ various devices to interact with their associated users. For example, UserAgent$_B$72 may send a display message to user$_B$ 60 by displaying it on Terminal 66 via TerminalAgent 76.

For example, a user's agent collects location information about its associated user from various sources, and then synthesizes that information into one opinion about where the user currently is. Location information sources could include sighting information from the Active Badges, from the Tab agents of the Tabs the user is currently carrying, from monitoring the input activity on various computer terminals, and from a variety of other sources. For example, the user might be carrying a portable global positioning system whose output can be attached to a portable computing/communication device so that the user's current location can be sent directly to the user's agent via an RPC call between the software running on the user's portable computing device and the user's agent.

One source of location information, as mentioned above, is Tab agents. Tab agents keep track of which cell their associated Tabs are currently in. A Tab agent does this by remembering the last communication packet it receives from its object; all communications packets contain the ID number of the cell they originated in or are being sent to. Agents depend on objects sending communications packets frequently enough so that each agent will know where its associated object currently is, and if appropriate the identity of the user using it. If the agent sends a packet to the wrong cell (e.g., because the object has since moved), then it will get no response back and will eventually try to resend the packet. In the meantime, the mobile device should have generated a beacon or a regular communications packet, including information of its new location.

When an application or agent needs to discover the location, or other personal information, of a particular user, it can request that information from that user's agent. When an application or agent needs to determine coincidence of users or devices are at or near a particular location, it uses the Location Service 82. Location-specific information about users and devices is registered in the Location Service 82 by the relevant agents. The Location Service will be discussed in more detail in relation to FIGS. 9A and 9B. The Location Service also keeps track of which applications and agents have expressed interest in being notified about changes in the set of users or devices currently at specific locations. When changes occur, the relevant set of interested clients are notified. Badge Service 84, which will be discussed in relation to FIG. 10, is used to keep track of the locations of Active Badges, which are attached to users. Badge Service 84 may also keep track of agents and applications who care about movement of particular badges (and hence users).

Input Monitor Service 86 is similar to Badge Service 84, except that it keeps track of individuals via the device or devices they use to make inputs to the system. Thus, in an area not equipped with a Badge detection system as previously described, a user may still be located by reference to the last terminal where an input was made. The input monitor service requires the ability to monitor activity on the various input devices of a system. In the present embodiment, the Input Monitor monitors workstation input by periodically polling each workstation in the system. Another way to perform input monitoring is to periodically poll all the relevant device agents in a system.

Applications 90, 92, and 94 communicate through agents with various parts of the system to accomplish a variety of tasks.

B. System Components

Figure 3:
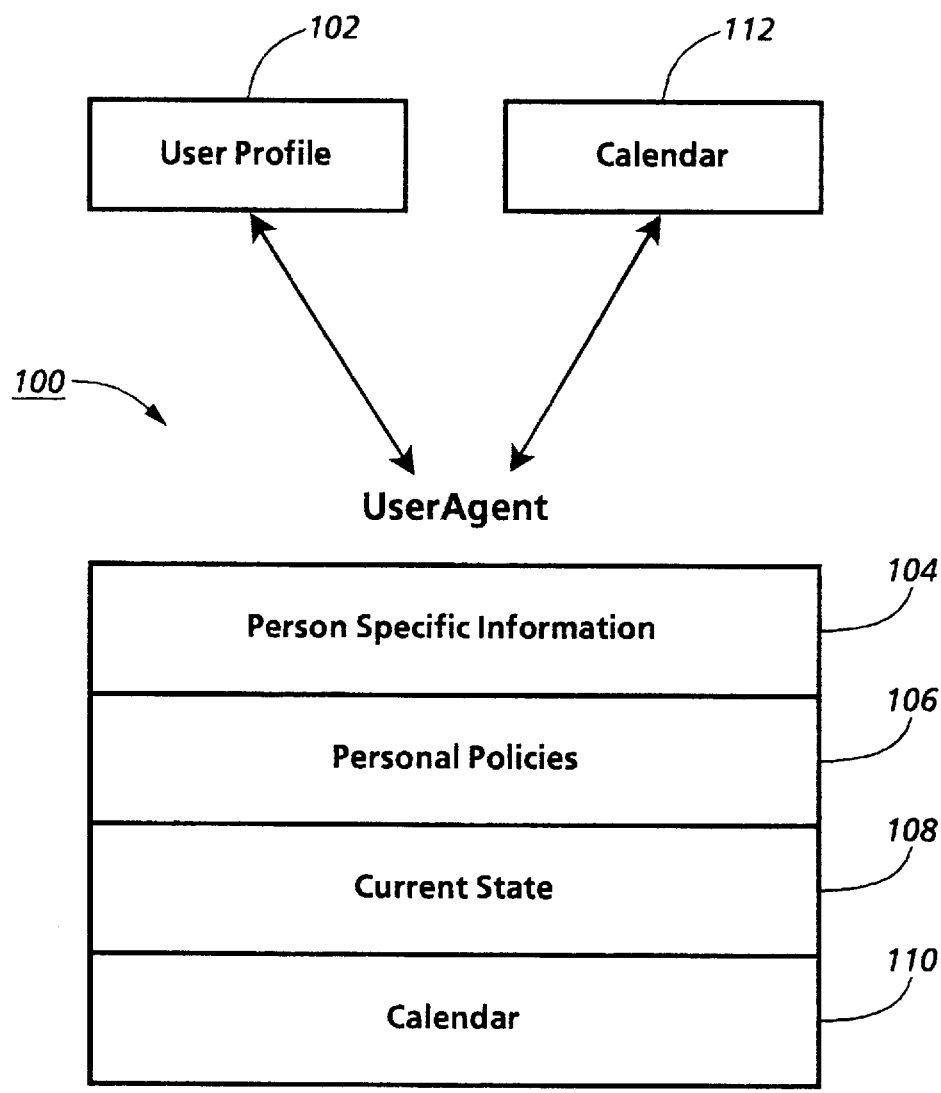
FIG. 3 shows general aspects of a UserAgent.
Figure 4:
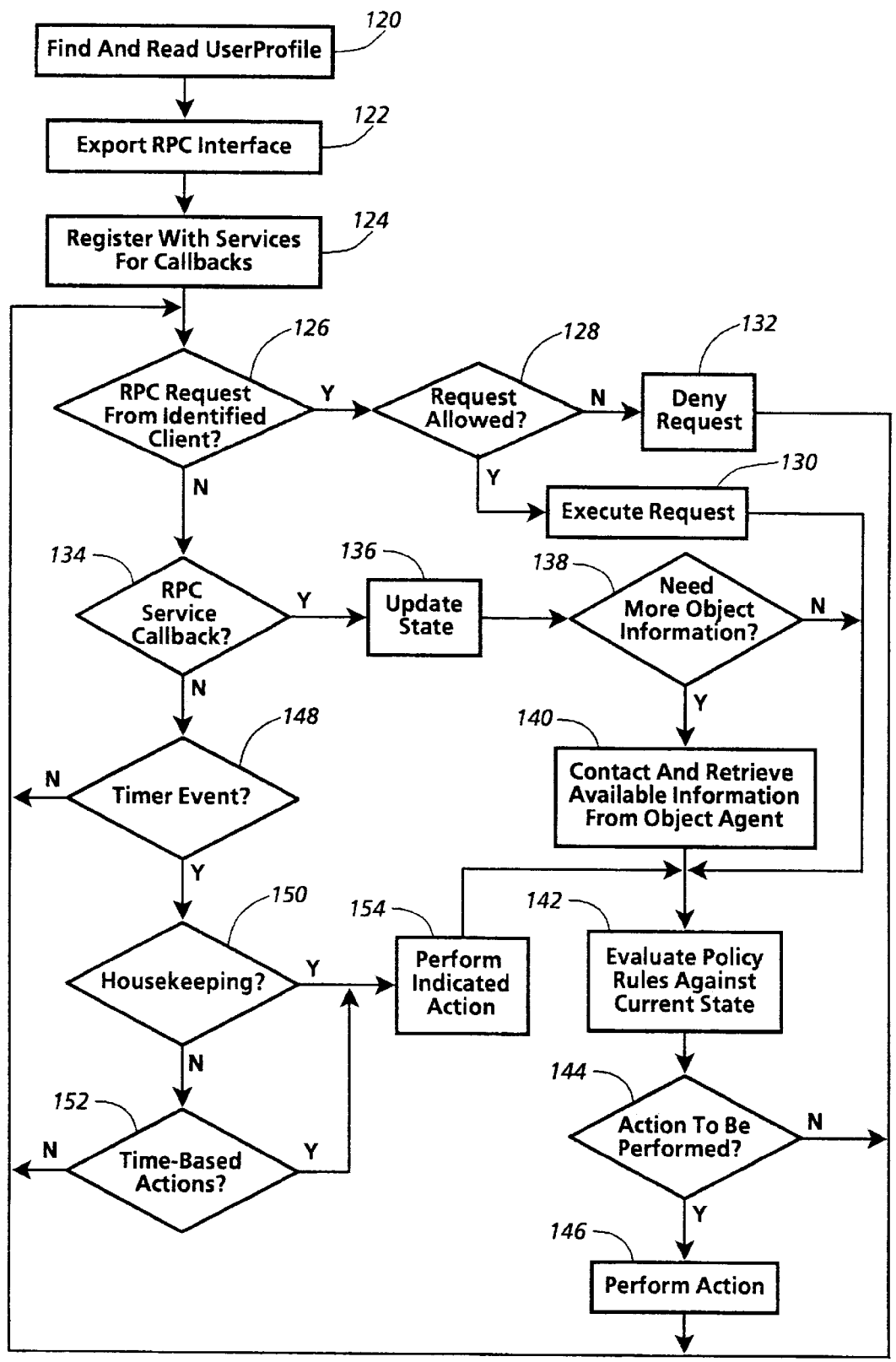
FIG. 4 describes the operation of a UserAgent.

FIGS. 3 and 4 describe aspects of the UserAgent. UserAgent 100, illustrated in FIG. 3, manages information about a particular user, and acts as the primary agent of customization of a user's applications with respect to their "environment," the surroundings that affect or may be affected by the user, including other users and devices and their states. As was described in relation to FIG. 2, each user has a particular, unique UserAgent. The UserAgent is a process that may be running on some trusted computer or computers on the network, and may be identified publicly, if it so desires, with a known address by registering with various services, such as the Name Service or Location Service.

Persistent information about a user's preferences is stored in a user profile 102. The UserAgent 100 may obtain information about the user from user profile 102 at startup time. UserAgent 100 serves as a general policy coordinator for both the user's privacy concerns as well as context-sensitive customization concerns.

UserAgent 100 gathers and manages person specific information 104, such as office number and affiliations, and personal policies and preferences 106 of the user from User Profile 102. Personal policies 106 may also be specified by the user for specific instances. Information about the user's context and environment, such as current location and a list of nearby users and devices, is stored in current state 108. UserAgent 100 propagates various computed consequences to the applications the user is running, and to the devices with which the user is interacting.

A user's preferences may be dynamically changed by either changing the profile file and alerting the UserAgent some way, or by explicitly executing a dialogue program that allows the user to directly specify which changes are desired to the profile or preferences.

Personal scheduling information, such as calendar 112, may be kept and distributed. At initialization, calendar content information 110 may be retrieved from 112 and managed by UserAgent 100. The UserAgent may understand the types of events in the user's calendar, such as "meeting" and "seminar." The user's calendar may maintain a fairly detailed description of the user's schedule, including things like indications of which times the user considers to be "work" time and which is considered "free" time. In general, there must be sufficient information in calendar 112 to distinguish whatever calendar-based rules the user desires to place in the policies 108 customization database. Calendar information may be correlated with particular contextual information to trigger certain reactions by an agent or application.

The UserAgent process typically initializes itself and then waits for various kinds of events to occur so that it can respond to each event in some appropriate fashion. It is thus an event-driven process: the internal state of the UserAgent process and the actions it performs are determined by the sequence of events that are "presented" to it.

User Agent 100 starts up in the step in box 120 in FIG. 4 by locating and reading the User Profile and user calendar information of the identified user. The user's profile is stored in known place, such as the user's home directory. The user's calendar information must also reside at a location in a file system known to the UserAgent, and may include a wide variety of user-specific information, including but not limited to meetings that are scheduled, and reminder notes that the user wishes to have delivered under various circumstances depending upon time, location, or context of the user.

The step in box 122 exports the RPC interface for UserAgent 100 so that would-be clients can find this UserAgent process and interact with it. This involves, among other things, registering an RPC address under the UserAgent's name with the Name Service. The step in box 124 registers the UserAgent with the location service and registers callbacks with any services which monitor state changes in which the user is interested. For example, the UserAgent may want to register with the Badge Service to receive active badge sightings for its user (if the system has deployed an active badge system). At initialization—before the UserAgent has received data regarding the user's location—the UserAgent may register in the location service with an assumed physical address, say the user's office, or may register as having an unknown location, depending upon the implementation.

Once initialization is done, the UserAgent essentially waits for an event to occur, and then performs the appropriate action in response to the event. The descriptions of agents herein describe, for simplicity, an essentially single-thread implementation. More sophisticated implementations may allow overlapped processing of events in a multi-thread setting. Although described in terms of a single-thread implementation, it will be clear that the present system may be implemented in a multi-thread system, thereby avoiding problems with single-thread systems known to those of skill in the art.

The step in box 126 looks for RPC requests. For client RPC requests the UserAgent must first check the current settings of the user's policy (which may depend on the current state being maintained in the UserAgent) to decide whether or not to honor the client's request. It may also check the requesting client's identity and authentication if the user's policies restrict responses to a subset of all possible clients. If the UserAgent grants the client's request in the step in box 128, the UserAgent responds to the client's RPC with whatever information is appropriate to the request in the step in box 130. Granting the request may involve changing the UserAgent's internal state, as well as having it issue various RPC requests to other processes in order to effect changes in the system outside itself. The response to the client may just be a return code indicating that a requested action (or state update) has been performed (or that it failed for some reason), or it may contain state information about the user and/or UserAgent that the client is interested in (e.g., the user's current location).

If the client's request has been executed, then the UserAgent evaluates its policy database to see if the request has changed the UserAgent's state in a way that will precipitate other actions. This step occurs in box 142 and is described in more detail below. If the UserAgent cannot authenticate the client and/or decides that the request should not be granted because of its user's policies, it replies to the client RPC request with a "request denied" response in the step in box 132, which may contain an explanation of why the request was denied. The amount of explanation returned—if any—is dependent on the implementation and on the policy settings the user has specified (e.g., the user may not wish to give out too much detail on why various kinds of requests are denied.)

Some possible client RPC requests are:
a) Request current location of user, which returns the current location of the user.
b) Update current location of user to be X, which tells the UserAgent that the user's current location should be changed to X.
c) Is user available for telephone calls?, which returns a Boolean value that indicates whether or not the user is willing to be disturbed by telephone calls.
d) Deliver message Y to user as soon as possible, which requests that the UserAgent try to deliver message Y (contained in the RPC request) to its user as soon as that is feasible—subject to the user's policy on delivery of urgent messages.
e) Notify me whenever the user changes location, in which a new client asks the UserAgent to generate a callback RPC to the client containing the user's new location whenever the user changes location. If accepted, the UserAgent will return an OK response to the RPC and will remember this request so that it can act on it whenever the user changes location. The UserAgent may also reject the request if the user does not wish to have locations tracked.

Services may also send callback RPCs to the UserAgent when information changes take place with respect to subjects that have been registered as being of interest to the UserAgent. For callback RPCs from other services, in the step in box 134, the UserAgent updates its internal state variables in the step in box 136 to reflect the information it has received in a callback. Moreover, the UserAgent may also execute various other actions if it is required to do so by the combination of the UserAgent's new state and the policy settings specified by the user.

Some possible examples of callback RPCs and the actions they might elicit in the UserAgent are:
a) Callback from Badge Service indicating that user was sighted at location X. The UserAgent will update its internal representation of where the user is currently located. If the user has changed location since the last time sighted, the UserAgent may have to perform various actions. For example, if there are any clients of the UserAgent that have requested change-of-location callback notifications, then the UserAgent will need to generate the requested callbacks at this time. Another action that the UserAgent may perform when the user changes location is notify the Location Service of the user's changed location and request callbacks for changes occurring at the user's new location. (This only needs to be done when the user's policy specifies that the UserAgent may register with the Location Service so that others can find the user by proximity.) If the user has left the region serviced by a particular Locations Service, the UserAgent deregisters the user from that Location Service altogether, and registers the user with a Location Service covering the new region. The UserAgent may further attempt to contact terminal or other device agents at the new location, for example, to attempt to deliver an urgent message that was not deliverable at the previous location.
b) Callback from Location Service indicating that some other person or object has come near the user's current location. The UserAgent will update its list of persons and objects known to be currently near the user. The UserAgent may also need to perform various actions. For example, if the user's calendar specifies that a reminder message be given to the user when near a specified person, then the UserAgent may need to try to deliver an urgent (i.e., reminder) message to the user if the specified person is now near the user.

Callbacks from various services may also require the UserAgent to attempt to gain further information as part of acting on the callbacks. For example, if another user has registered with the Location Service in only a partial fashion (i.e., given a UserAgent RPC address to the Location Service, but not included an actual name or any other identifying information), then the UserAgent will try to request more information from the other user's UserAgent. If the unknown user and the UserAgent's user are friends, then the anonymous user's UserAgent may be willing to return more information to the UserAgent than it was willing to publish in the Location Service, where it might be publicly accessible.

When the UserAgent receives a timer alarm event in the step in box 148 it looks at its current state and checks to see if any "housekeeping" functions need to be performed, or if any time-based actions 152 (e.g., calendar reminders) need to be performed. If an action is performed which may change the state of the UserAgent, the UserAgent checks its policy database in the step in box 142 to determine if further actions are warranted.

Some possible examples of timer alarm event actions the UserAgent might take are:

a) Remove any expired entries from the calendar.

b) Send out a meeting reminder to the user for a meeting that is about to occur, for example via urgent message delivery applications.

c) Modify the UserAgent's estimate of the user's current location and the likelihood that the user is at that location. For example, the longer that the user is not sighted by any sensing system, the less likely it is that the user is actually still at that same location (except, perhaps, for certain special locations, such as the user's office). The step in box 154 performs the appropriately indicated action.

d) Cease trying to deliver an urgent message through the currently chosen terminal.

There are several ways in which the UserAgent's evaluation of user policy and subsequent performance of state update and actions might be implemented. In one possible implementation, policy is implemented primarily as a set of IFTHEN rules. An "inference engine" runs over the rules database and executes the code of any rules whose condition holds true. Personal policies 108 may use a rule-based approach to specify policy requirements. Some examples, described in pseudocode, are:

IF INMEETING THEN DISABLE MESSAGE DELIVERY or

IF INMYOFFICETHEN DISPLAY:=WORKSTATION ELSE DISPLAY:=MYTAB.

Techniques known from fields such as artificial intelligence expert systems can be employed to make this policy inference engine work well.

In an alternative implementation, policy is implemented by a cooperating set of "specialist" modules that understand particular domains of interest. This is illustrated in FIG. 2 by agent 72. The UserAgent may run multiple specialist modules in parallel or time-multiplexed, and post each event to some or all modules. Each module acts only on those events that are relevant to it. For example, there might be an "urgent message delivery" module that tries to deliver queued urgent messages to the user. This module would watch for events that changed the condition on one of its queued messages from don'tdeliver-yet to deliver-now. An example of such an event might be a change-of-location callback from the Badge Service or a callback from the Location Service indicating that all the people that were near the user have moved. The former event might effect a message that should only be delivered when the user is at home. The latter event might effect a message that should only be delivered when the user is not obviously in a meeting (i.e., with other people).

Modules may also provide various "services" that can be invoked by each other. For example, the "urgent message delivery" module would presumably offer to queue messages for delivery that have been generated by other modules of the UserAgent.

There is no requirement for any UserAgent to employ the same implementation as any other, so a variety of implementations may be employed in a single system.

Figure 5:
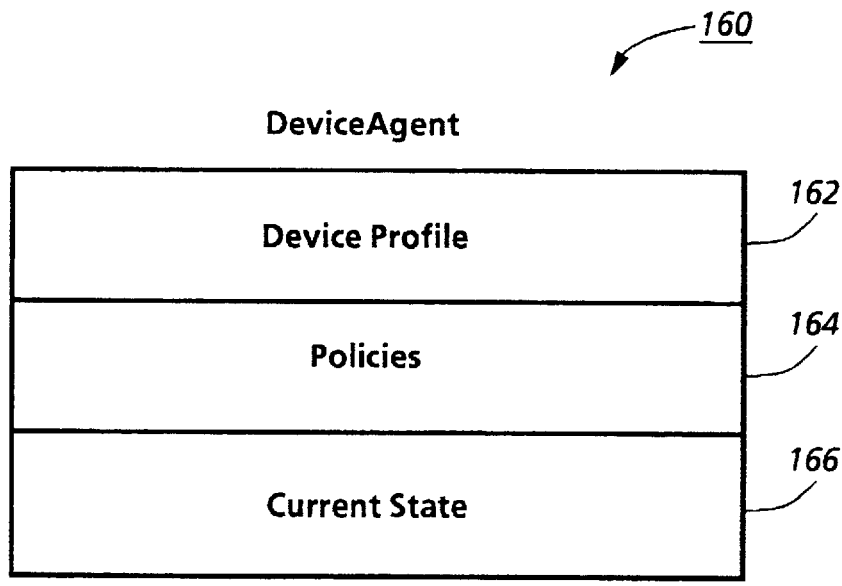
FIG. 5 shows general aspects of a DeviceAgent.
Figure 6:
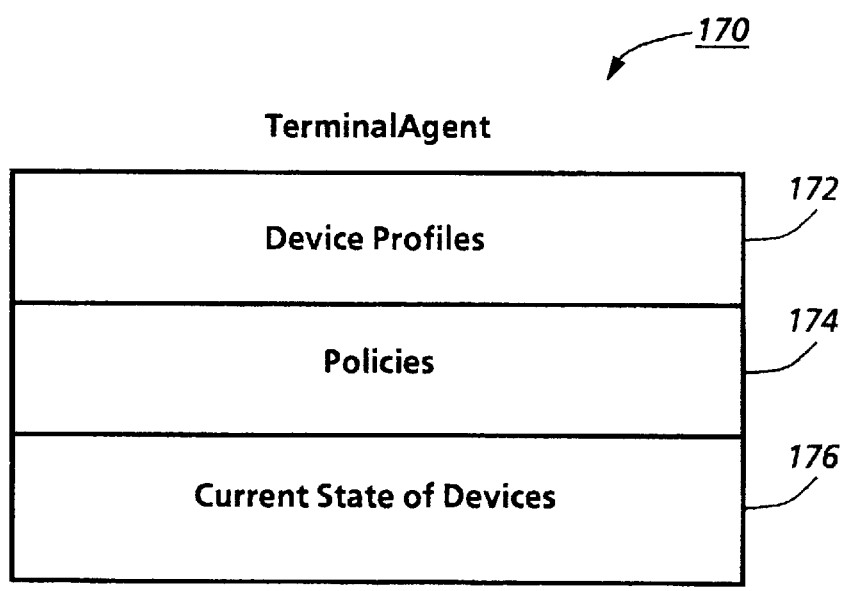
FIG. 6 shows general aspects of a specialized device agent, a TerminalAgent.
Figure 7:
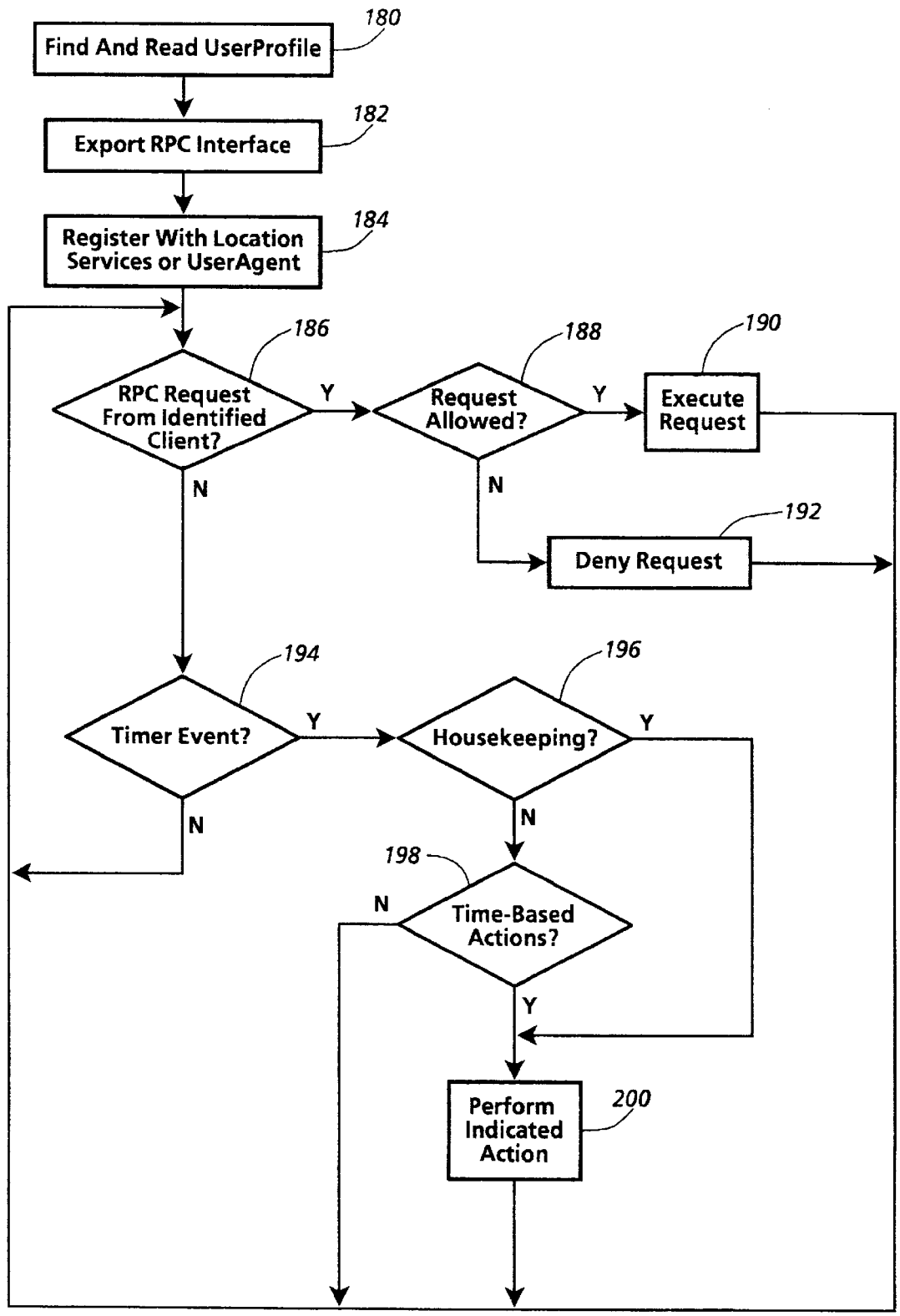
FIG. 7 describes the operation of a DeviceAgent.

FIGS. 5–7 describe aspects of the DeviceAgent 140. Just like the UserAgent process, the DeviceAgent process is an event-driven process and has a similar overall structure to it. As described previously, the DeviceAgent may consist of several modules, some of which perform system infrastructure functions, and some of which are responsible for implementing the agent's responsibilities for specific applications. Devices may not need to keep track of the state in other services, hence would only need to respond to two different kinds of events—RPC requests from clients, and Timer alarm signals.

As shown in FIG. 5, DeviceAgent 160 includes a device profile 162 which describes relevant information about that particular device, policies 164 which may also describe allowable operations for the device, and the current state 166 of the device. The profile 162, policies 164, or current state 166 may, for example, describe the ownership or capabilities of the device. Ownership may comprise exclusive or shared computational control of a device assigned to a user. Policies 164 may also describe temporarily set policies, set by the user with at least partial ownership of the device. Tabs or Pads or other computing devices may be controlled by DeviceAgents. Other kinds of devices that might be controlled by DeviceAgents include printers and copiers.

FIG. 6 shows TerminalAgent 170. A TerminalAgent is a specialized form of DeviceAgent for a "terminal," or a cluster of input-output devices for allowing humans to interact with their computing systems. Terminals generally are fairly complicated devices that combine several more highly specialized devices. For example, a terminal may comprise a computer workstation including a keyboard, mouse, screen, sound card and processor. Typically one or more "display devices," such as a computer display screen, and one or more "input devices," such as keyboards and mice, also are included in a terminal. TerminalAgents manage these combinations of devices as a single entity that is used for coherent activities (that is, all the constituent devices are used in concert for a single activity, such as receiving and reading an urgent message). To that end, the TerminalAgent may be composed of several modules as described in relation to FIG. 2. The current state 174 of the devices are all managed appropriately by TerminalAgent 170, in accordance with terminal policies 176.

FIG. 7 describes the general operation of a DeviceAgent. The device's profile information is read in the step in box 180. The device profile file may be read from a specified file known to the DeviceAgent. The step in box 182 exports an RPC interface so that would-be clients can find this DeviceAgent process and interact with it. This involves—among other things—registering an RPC address under the DeviceAgent's name with the Name Service.

The physical location of the device is registered in the step in box 184 with either the Location Service (if it is a publicly available device) or with the UserAgent of its owner (if it is a privately owned device). This allows relevant parties to find the device by proximity.

As with the UserAgent, once initialization is done, the DeviceAgent sits in a loop (or several parallel loops) waiting for an event to occur, and then performs the appropriate action in response to the event.

Processing client RPC requests is done in the DeviceAgent in a manner similar to that of the UserAgent. In the step in box 186, clients making requests are identified, and the device's policy database (and current state) is then used to decide in the step in box 188 whether or not to perform any given client RPC request.

Device "policy" can be thought of as two different things: There is devicespecific "policy" that describes things like the font to use for text in displayed messages and the color to use for various displayed windows. There is also device owner-specific policy that governs who may use the device and in what manner. The former kind of policy information is simply a means of allowing the overall behavior of specific devices to be customized (e.g., using larger fonts for a meeting room's large-screen electronic whiteboard than for an individual user's workstation screen). The latter kind of policy information is "true" policy information in that it governs how a device may be used in any given circumstance.

Owner-specific policy information allows a device to decide which client RPC requests to honor in the step in box 190 and which to deny in the step in box 192. It can also determine which of several "behaviors" the device should exhibit under various circumstances. For example, the owner of one device might specify that urgent messages should be announced by means of an audio beep, while another device's owner might specify that urgent messages should be announced by flashing the display screen but NOT emitting an audio beep.

Policy information can be changed by a device's owner (or by anyone if there is no explicit owner) by means of RPC client requests or other means, such as file editing. For example, a client might request that all windows be displayed in a particular color and with scroll bars on a particular side from now on. If a device can be owned (some devices' profiles may state that they cannot be owned by anyone), then its policy information may revert to default values when ownership of the device is relinquished. Whether or not that happens can itself be something that is determined by the device's policy information.

Some possible examples of client RPC requests to a TerminalAgent are:
  a) Deliver urgent message X. The DeviceAgent will try to deliver message X. For example, it might emit an audio beep and display a window containing the text of message X. When the user has read the message it may be "dismissed" (e.g., by clicking on a DONE button) and the DeviceAgent would remove the message window and reply to the client RPC request with a return code of "delivered."
  b) Deliver urgent message X with notification. Same as the previous example, except that the DeviceAgent first displays a window announcing the availability of an urgent message and (optionally) displaying the subject line of the message (if there is one). This allows the human recipient to defer reading the message to another time (e.g., if it is a private message and the user is currently in a public environment).
  c) Establish a media call connection of type X with device Y. The DeviceAgent will set up the appropriate connection between its own device and the remote device specified by Y. For example, this might involve establishing a video connection with a device at the network packet address for device Y. Or it might involve setting up an audio connection, a Unix talk session, or some other form of connection.
  e) Claim ownership. The DeviceAgent will only honor RPC client requests from the specified owner once this request is granted.
  f) Relinquish ownership. The DeviceAgent will accept client RPC requests from anyone once this request has been processed.
  g) Query capabilities and state. If granted, the DeviceAgent will return a record containing information about its capabilities (e.g., {1000×1200 pixel display, 256 colors, video-capable, X-window-capable}) and its current state (e.g., {on, owned, video connection currently established}).
  h) Set state. If granted (i.e., authorized and a correct operation is being requested), the DeviceAgent will set its state as requested (e.g., set state so that all future X windows displayed have a red title bar)

The step in box 194 responds to timer events. Timer events may include housekeeping duties as shown in the step in box 196, or time-based action as shown in the step in box 198. The indicated action is performed in the step in box 200. For example, a timer alarm event action the TerminalAgent might take is:
  a) Abort an urgent message delivery that has not been responded to. If the intended recipient has left the vicinity of the device or is simply ignoring it, then the DeviceAgent will eventually abort its attempt to deliver a message and return a "timed-out" return code to the client requesting the delivery.

The DeviceAgent can implement its policy evaluation and decisions in the same ways that the UserAgent might. Note that there is no requirement for any DeviceAgent to employ the same implementation means as any other DeviceAgent or as any UserAgent.

FIGS. 8–11 describe the Name and Location Services shown in FIG. 2. The Name and Location Services maintain two categories of information-registered names with appropriate information about them according to the service, and standing queries which request callbacks for particular changes in the information. In some implementations, the Name and Locations Services may implement subsets of the features here in described. For example, a Name Service may be implemented that does not register or monitor callback requests.

In one implementation, both services may store information in the form of "tuples." Tuples are unordered sequences of (key, value) pairs: ((k1, v1) (k2, v2) . . . ). Keys are text strings, and values are uninterpreted byte sequences. A value v may also be comprised of additional tuples. Each pair also has an associated unique ID value that it is given when it is first created. To delete or change a tuple's value (i.e., its sequence of (key,value) pairs), a client must present the unique ID of the desired tuple.

To find tuples, clients specify a matching pattern of the form ((k1, v1) (k2, v2) . . . ), where each k specifies the name of a key field and each corresponding v specifies the values that should be matched against for that key field.

Any keys not mentioned in the matching pattern may have any value as far as the matching query is concerned. For example, the matching pattern ((name, UserAgent-theimer)) will match any tuple in the Name Service that contains the (key, value) pair (name, UserAgent-theimer). One example of a tuple that would match is ((name, UserAgent-theimer) (uid, 6812) (rpcAddr, <13.8.23.115.1528>)) Similarly, the matching pattern ((owner, theimer)) would match any tuple that included an owner specification of "theimer".

In one embodiment, the values of matching patterns may be regular expressions. Thus, for example, the matching pattern ((name, UserAgent-*)) matches any tuple whose name field is of the form UserAgent- followed by an arbitrary text string (e.g. Theimer).

It is clear that information in Name and Location Services may be organized in other ways. For a particular service, for example, values may be ordered—the name always the first item in the list for each object, the network address always the second, and so on, thereby avoiding the need for explicit keys. The present implementation using tuples allows considerable flexibility, however, since information made available may vary, and information may be added which is of interest to only a subset of possible Service clients.

Figure 8:
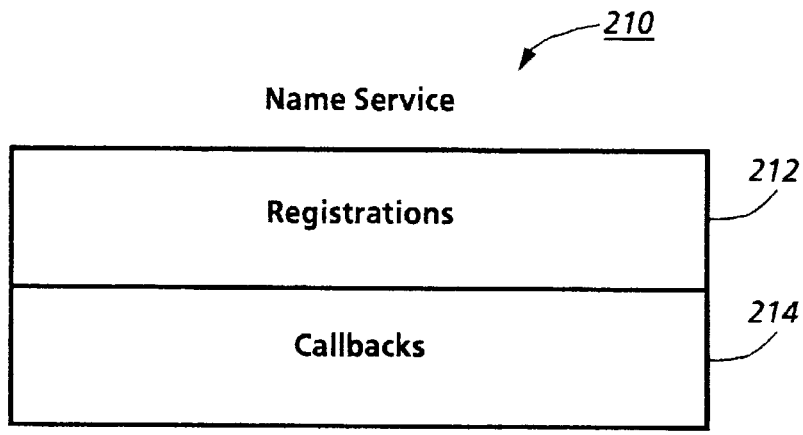
FIG. 8 shows general aspects of a Name Service.

Name Service 210, shown in FIG. 8, provides a repository into which clients can deposit tuples, change or delete existing ones (possibly subject to ownership restrictions), and search for (key, value) pairs matching various naming criteria. Name Services may be organized in a hierarchical fashion in order to allow them to handle larger systems. This technique, which is known in the art, involves partitioning the system into "domains," each of which is handled by a single Name Server. For example, one might create a separate domain for each building in the system and hence run a Name Server for each building. To find the appropriate Name Server to use, a client must know the name of the domain it is interested in. Higher level Name Servers maintain registrations that map from domain names to the specific Name Servers that service those domains. For the purposes of the present discussion, however, the system will be described in terms of a single Name Service.

An example of a Name Service registration tuple, part of 212, is a UserAgent registration, which contains (name, UserAgent-<name>), (net address, UserAgent-<netaddress>), and other (type, UserAgent-<type>) pairs. Another example is a DeviceAgent registration, which will contain (name DeviceAgent-<name>) (net address, DeviceAgent-<netaddress>), and other (type, DeviceAgent-<type>) pairs. It may also include other information, such as the capabilities of the device it represents.

When clients query the Name Service for tuples, they get back the values of all tuples that match their queries. Clients can also issue "standing queries," whose semantics are to initially return all matching tuple values and then to cause "callbacks" 214 to the clients with any new tuple values that match the query as they are added to the Name Service. (Changed or deleted tuples also get returned.) For example, a client can find out about all current and future tuples whose type field value is DisplayDevice by issuing the standing query ((type, DisplayDevice)). Whenever a new registration with a type field value of DisplayDevice appears or disappears, the Name Service will generate a callback RPC to the client containing the value of the newly registered tuple.

The Name Service can be implemented in a variety of ways. A very simple implementation can be achieved by running a single process on a known computer host. This process exports a known RPC address so that any clients can reach it by issuing RPC requests to that known address.

Other fault tolerant implementations, known in distributed systems literature, are also possible.

Figure 9:
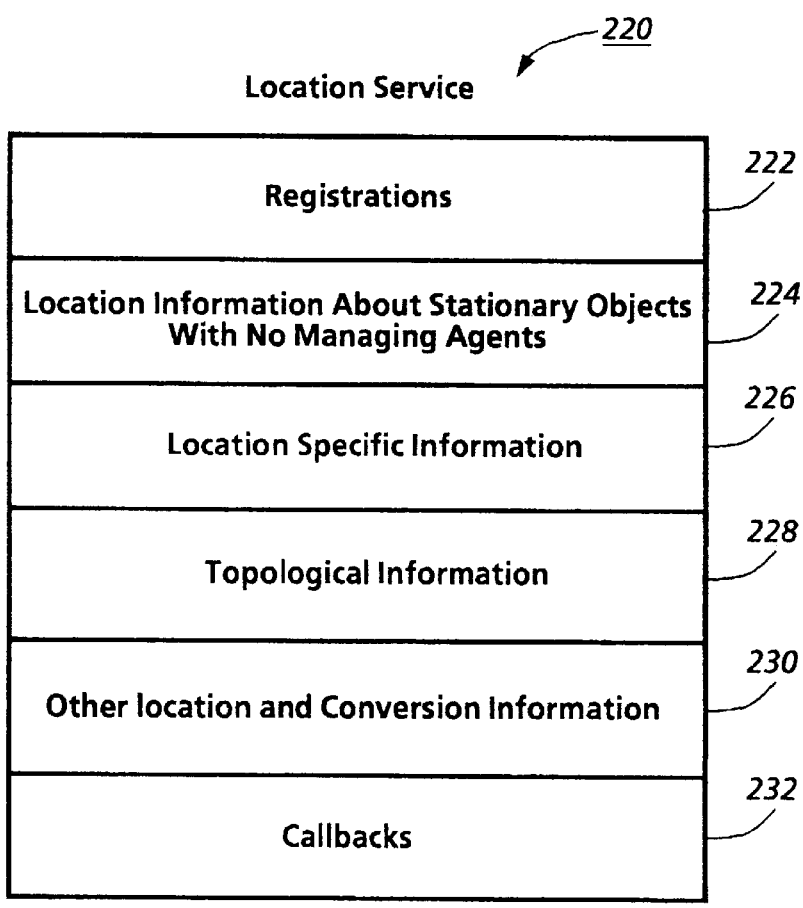
FIG. 9 shows general aspects of a Location Service.
Figure 10:
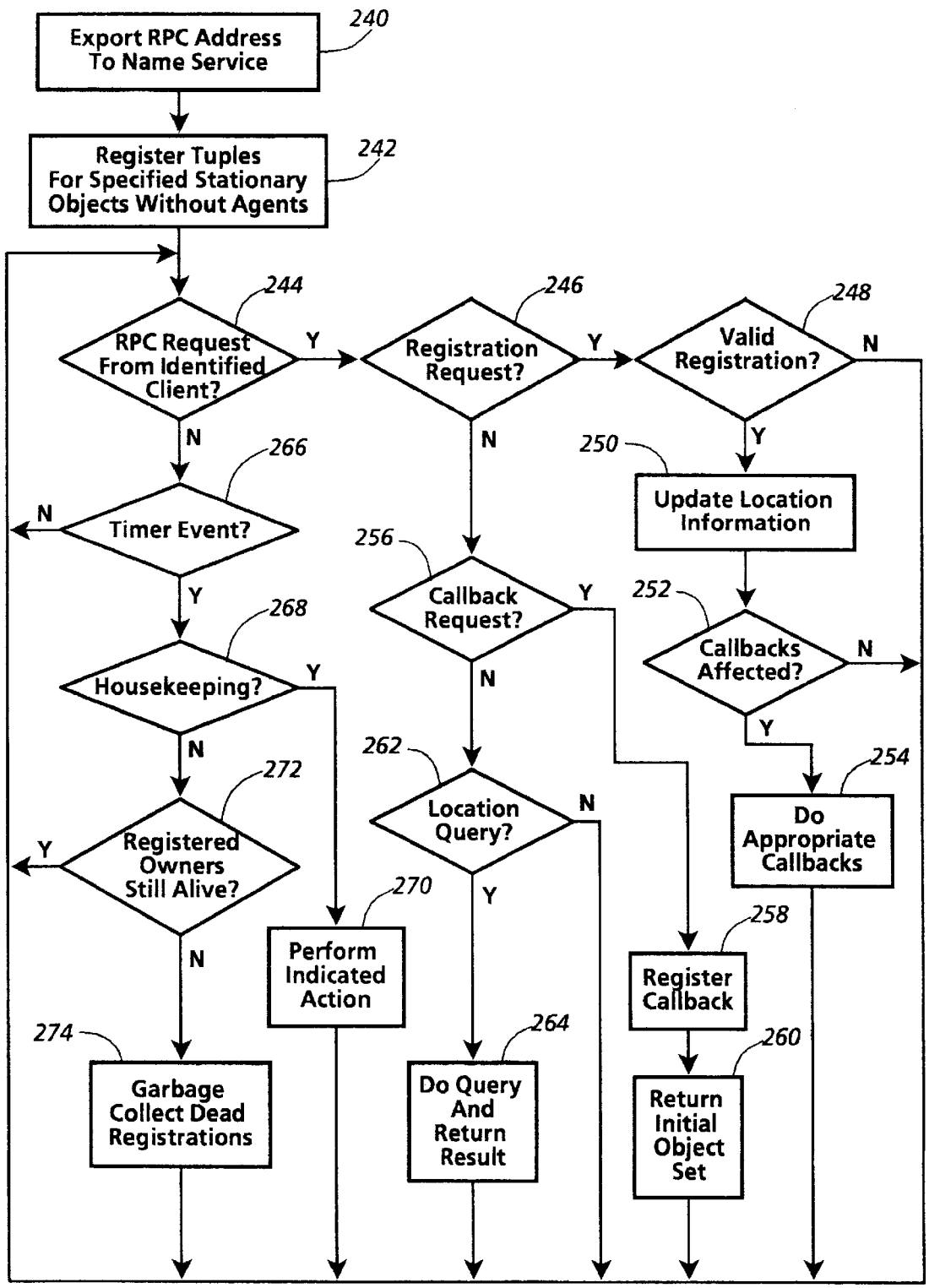
FIG. 10 describes the operation of a Location Service.

FIG. 9 describes Location Service 220. The Location Service provides a place to store location specific information and a way of executing queries over that information. Globally, locations are in general volumes of space that are specified by some geometric means that can situate them within the physical world. An example of a description of a location might be a set of three-dimensional "base" objects, the union of whose volumes represents the location. Base objects might be easily described objects such as spheres, and cubes, and must all have a description of their placement in the physical world, such as (x,y,z) coordinates of the center of a sphere with respect to some well-known physical landmark such as the center of the earth. Relative addressing may be used if everything in the entire system uses the same frame of reference. For example, locations might specify (x,y,z) coordinates with respect to the entrance of a building if the entire system under consideration is contained by the building, and every process using the location information understands the relative addressing being employed.

More convenient forms of local addressing can also be employed that assume various specifications as default values. For example, locations might be merely the room numbers of a building if everything in the system that needs location information can understand this notation. Implicit specifications in this case may be the dimensions of each room. Processes using this form of location notation would still have to understand the relationships between room numbers, such as the distance between any two given rooms. This implies that at least some part of the system must either store the relevant information or be able to derive it from room numbers directly. One place where this information might be stored is the Location Service. Clients could then obtain information such as distances between rooms by querying the Location Service with specific pairs of room numbers.

The Location Service is similar in nature and function to the Name Service. That is, it maintains a tuple space into which clients can register tuples that can be found by other clients. (Clients can also modify or delete the tuples they register.) However, tuples registered with the Location Service must contain a (key, value) pair whose key is "location" and whose value is a physical location that is within the "domain" of the Location Service. The physical world is partitioned into domains, each of which is "owned" by a particular Location Service. Location values included in a tuple must be valid physical location descriptions. The Location Service also implements distance computations over location information and queries that can return all tuples registered for locations matching various distance specifications from a specified location or set of locations. An example of such a distance-based location query is, "Match all tuples whose location is within 100 feet of location X and whose type field has the value 'printer'."

Like the Name Service, the Location Service also registers standing query callbacks 188 that allow clients to be quickly notified of changing tuple registrations at various locations or in various regions.

The present embodiment of the Location Service consists of a single process that is found by clients through the registration it makes for itself in the Name Service. The registration contains the name of the Location Service ("PARCLocationService") and the RPC address to which client RPC requests can be sent.

Clients can register more or less information about themselves in the Location Service, depending on how much they wish to safeguard their privacy. Two common forms of registration are:

a) full disclosure of information for "public" objects, such as printers, device agents, etc.

b) disclosure of a type field (e.g., person) and RPC address to which further requests for information can be directed. The second form allows things like user agents to register the presence of their users at various locations without revealing exactly who they are.

Privacy may also be maintained by registering false or misleading information about location, with differing levels of certainty based on the trust in the registering or sighting entity. More discussion concerning privacy issues in the system herein described may be found in coassigned, copending Patent Application Serial No. (Attorney Docket No. D/93691), previously referenced. For the purposes of this application, "location" will be used to mean the presumed or apparent location for whatever degree of certainty is needed for a particular operation.

As shown in FIG. 9, Location Service 220 contains Location Information 222 and 224 which describes the locations of physical objects. All physical objects of interest fall into one of two categories: 1) objects for which some external client of the Location Service, for example a DeviceAgent, is responsible for updating the Location Service; and 2) objects which are stationary, have no managing agent process, and have their location provided to the Location Service when it is initially started from a known file. Category 1) tuples contain at least (location, <current location>) and (net address, (netaddress>) pairs, while category 2) tuples may contain (location, <location>) pair and pairs that describe the object, e.g., (type, copier)

Location specific information 226 may be indexed by the location to which it is specific. For example, information describing the number of windows in a room is specific to the particular room being described. When meetings may be scheduled in a particular room is also specific to that room. Clients of the Location Service may obtain information specific to a given location by querying the Location Service for all information that has been registered with it for that specified location.

Topological information 228 may also be stored by the Location Service. An important aspect of location information is that of allowable paths between any two given locations. For example, the distance between two rooms in a building is not usually the Euclidean distance. Instead it is the sum of the distances along the corridors connecting the two rooms. Topological information specifying allowable paths between locations can be stored for some or all parts of the system.

The Location Service may also store other location information 230, which includes location information that is not directly derivable from the specifications of locations, or conversion information to support conversion between various forms of location specification used in the system. Thus, for example, if some processes use room numbers as location specifications and others use sets of basic volume objects, the Location Service will translate one representation into the other. The Location Service may store callback registrations 232.

Like Name Services, Location Services are generally organized hierarchically by regions, with a Location Server per region. Again, for the purposes of the present discussion, the system will be described in terms of a single Location Service.

In FIG. 10, the Location Service exports its RPC address at initialization to the Name Service in the step in box 240, and initializes its tuple space and registers the values of any stationary objects that are listed in the Location Service's "initialization file" in the step in box 242. For example, the locations and descriptions of stationary printers and copiers can be loaded into the Location Service during initialization so that they can be found by interested clients.

This form of initialization pertains only to objects that have no agent processes managing them, since agent-managed objects will be registered by their agent. Initialization information can be obtained from a variety of places. In the present embodiment, it is read in from a known file.

The step in box 244 looks for RPC requests. If the request is for a registration in the step in box 246, the Location Service must first check that the registration is valid (i.e., specifies a valid location) in the step in box 248. If so, the current location information of the registered object is updated in the step in box 250. This may include registering a new object which has entered the Location Service domain, updating the location of an existing registered object, or removing the location information of an object that is leaving the domain of the Location Service.

Requests to register or update the location of objects with the Location Service are made by their managing agents. Public objects whose identities and locations are not meant to be kept secret—such as printers and office display terminals—may register a full description in the Location Service. Private objects—such as a User Agent—register customized descriptions of themselves that reveal only what they wish to make publicly available. Registrations include an RPC handle that can be used to contact the agent representing the located object for further information or interaction for customized registrations. The agent can then choose to answer further queries based on the access control policies of that agent.

The step in box 252 checks to see if any callback requests have been affected by the updated information of box 250. For example, a user agent may have previously registered a request for notification of any new objects moving into a particular office the user is in. The step in box 254 performs any appropriate callbacks based on the updated information.

The RPC request may be, as shown in the step in box 256, a request for callbacks as described above. The step in box 258 registers the callback request, and the step in box 260 returns an initial object set in response to the callback.

The RPC request may further be a one-time location query, as shown in the step in box 262. For example, a user agent may wish to know what devices are present at some particular location. The step in box 264 returns the result of the location query.

When the Location Service receives a timer event in the step in box 266 it looks at its current state and checks to see if any "housekeeping" functions need to be performed in the step in box 268. The Location Service also periodically checks with the agents of registered objects to see if they are still active in the step in box 272 by sending a query to the registered agent and waiting for a response. If no response is received, the Location Service will assume the registration is no longer valid and collect the "dead" registrations in the step in box 274. If, for example, a UserAgent crashes, it will continue to be registered with the Location Service at its last known location. Any new instances of the UserAgent will not generally know about previous registrations, so will reregister itself with a new request. When the Location Service performs its status check, however, it will determine that there is no valid agent still at the registered address, and remove that registration.

Figure 11:
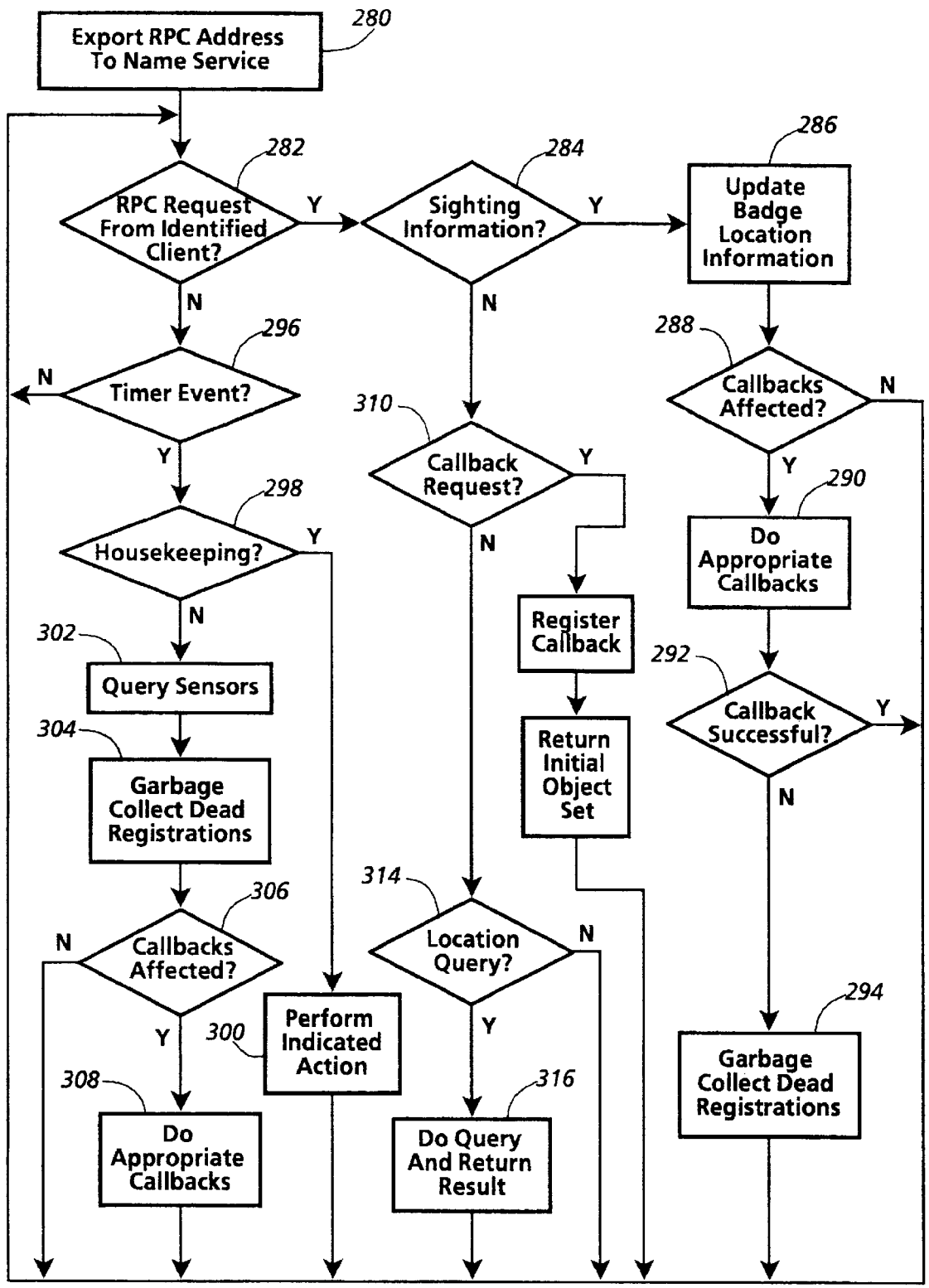
FIG. 11 describes the operation of an Active Badge Service.

FIG. 11 describes an Active Badge Service and its operation. In the present implementation, the active badge system consists of strings of infrared sensors 15, each of which is controlled and monitored by a "Poller" process. A string of sensors is a serial line that runs past, and is connected to, every sensor on the string, and that terminates in the serial line port of a workstation.

The Poller process on the workstation uses the serial line to communicate with designated sensors. Each sensor has a unique ID and the Poller process can query a particular sensor or issue a command to it by indicating the ID of the desired sensor in the communications interchange. Poller processes query each infrared sensor on their string in turn to obtain sighting information from them. That is, if an Active Badge is seen by a sensor, then that sensor will queue that fact up and will relay it to the Poller process when queried. The Poller process batches up all badge sighting information it obtains from a round of querying the sensors and sends it to the Badge Server. This procedure of querying all sensors and forwarding any sighting information thus obtained is repeated by the Poller process continuously.

While there is a Poller process per string of sensors, there is only one Badge Server process per administrative domain (i.e., an entire division or company with up to hundreds of users). The Badge Server exports an RPC address and registers it with the Name Service in the step in box 280, so that Poller processes and clients of the Badge Server can find it. Again, the Badge Service accepts RPC requests from identified clients in the step in box 282.

The Poller provides sighting information to the Badge Service in the step in box 284. The Badge Server updates its location information for the identified badge in the step in box 284, checks for affected callback registrations in the step in box 288, and performs any necessary callbacks to interested clients in the step in box 290.

If a callback fails (i.e., the called client process does not respond) then this is noted in the step in box 292. Failed callbacks have their registrations garbage-collected in the step in box 294.

If a callback request is found in the step in box 310, the BadgeServer checks if the RPC request is for registering a callback. In the step in box 312, a callback is registered to have callbacks sent to the client for sightings of a particular badge (specified in the request). In the current implementation, the Badge Server implements no form of authentication or other control. Any client can request to receive information about any location or any badge ID. The primary clients of the Badge Server are UserAgents. Authentication controls could be added so that the Badge Server only returns information about a particular badge ID to a list of authorized clients for that badge ID. This would allow users to ensure that only their UserAgents can track their movements by simply watching the active badge sighting data. Of course, this is only true to the extent that the Badge Server is "trusted," and that no one is "illegally" monitoring communications between the Badge Server and Poller processes or the Badge Server and clients. Encryption will help partially for this problem, but a sophisticated monitoring party can employ traffic analysis techniques to deduce a certain amount of information.

Another way to make tracking of active badge data harder is to not publish the mapping between active badge IDs and users. In that case, anyone receiving sighting data would not be able to directly ascertain to which user a particular badge sighting refers, although it will be recalled that traffic analysis can frequently allow one to deduce this information.

The Badge service will also answer one-time location queries in the step in box 314, by performing the desired query and returning the result in the step in box 316. When the Badge Service receives a timer event in the step in box 296, it looks at its current state and checks to see if any "housekeeping" functions need to be performed in the step in box 300.

Figure 12:
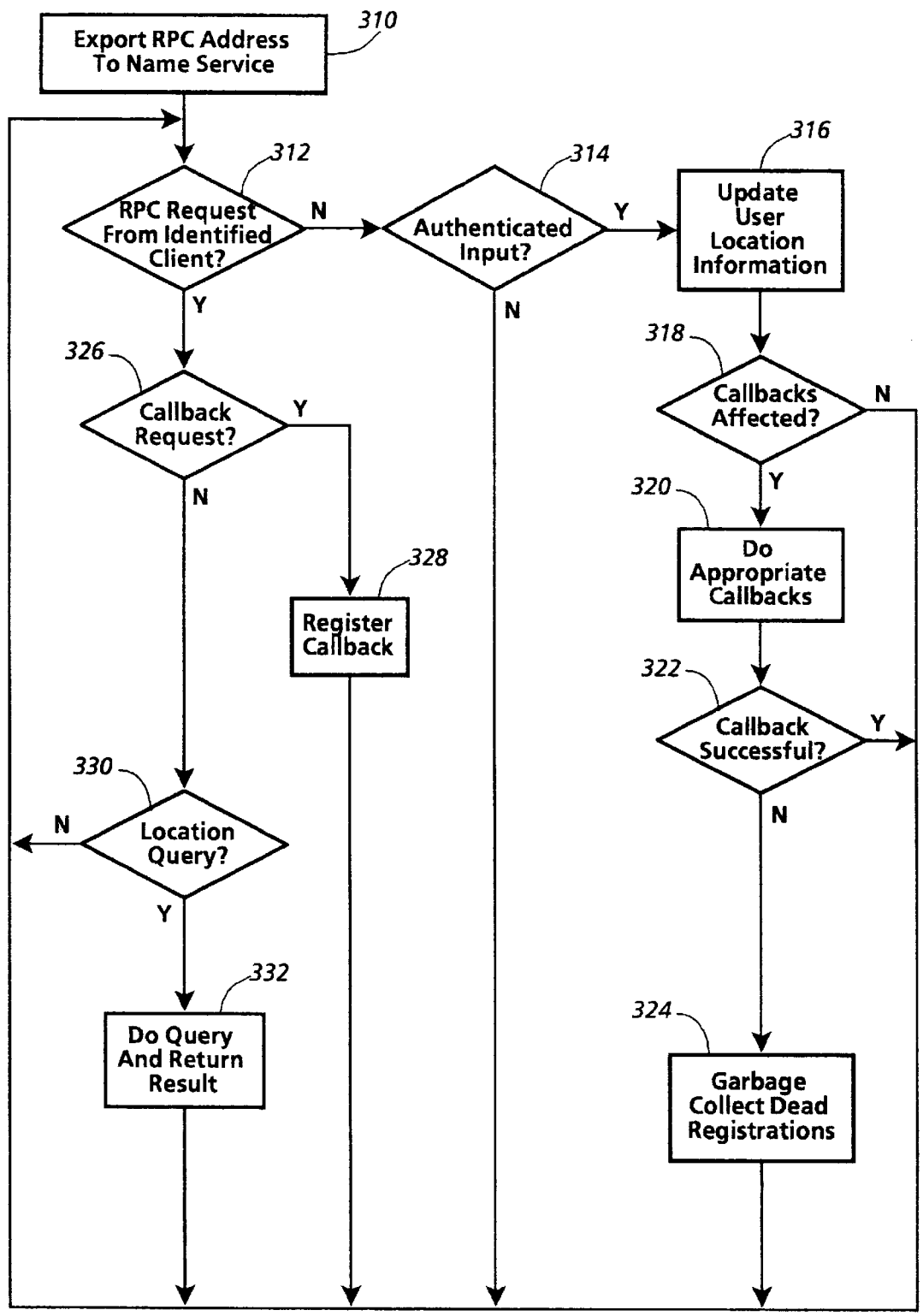
FIG. 12 describes the operation of an Input Monitor Service.

FIG. 12 describes an Input Monitor Service and its operation. The Input Monitor Service monitors the inputs made on input devices, such as workstation keyboards, and manually provides input to UserAgents for their own user. Alternatively, it may provide publicly available information for a list of prespecified users. The Input Monitor Service is particularly useful for locating users without electronic signaling devices such as Active Badges or Tabs, and for users outside of the physical sensing domain of the Badge Service (i.e., for a user working in the system remotely, perhaps from home). In one embodiment, as described above, each input device includes a facility for monitoring authenticated users using that device. If an authenticated input is discovered, then that facility will queue that fact up and will relay it to the poller process when queried. This facility is periodically monitored by the Input Monitor Service. Alternately, the Input Monitor Service may also periodically pool all the relevant device agents in the system.

The procedure of querying all input devices and forwarding any input information thus obtained is repeated continuously. The Input Monitor Service exports an RPC address and registers it with the Name Service in the step in box 310, so that processes and clients of the Input Monitor Service can find it. Again, the Input Monitor Service accepts RPC requests from identified clients in the step in box 312.

Input information from authenticated users is monitored in the step in box 314. The Input Monitor Service updates location information for the authenticated user in the step in box 316, checks for affected callback registrations in the step in box 318, and performs any necessary callbacks to interested clients in the step in box 320.

If a callback fails (i.e., the called client process does not respond) then this is noted in the step in box 322. Failed callbacks have their registrations garbage-collected, and the appropriate clean-up steps taken, in the step in box 324.

If an RPC request is made in the step in box 312, the Input Monitor Service checks if the RPC request is for registering a callback in the step in box 326. In the step in box 328 a callback is registered to have callbacks sent to the client for sightings of a particular user (specified in the request). The Input Monitor Service will also answer one-time location queries in the step in box 330, by performing the desired query and returning the result in the step in box 332.

C. General Operation

Figure 13:
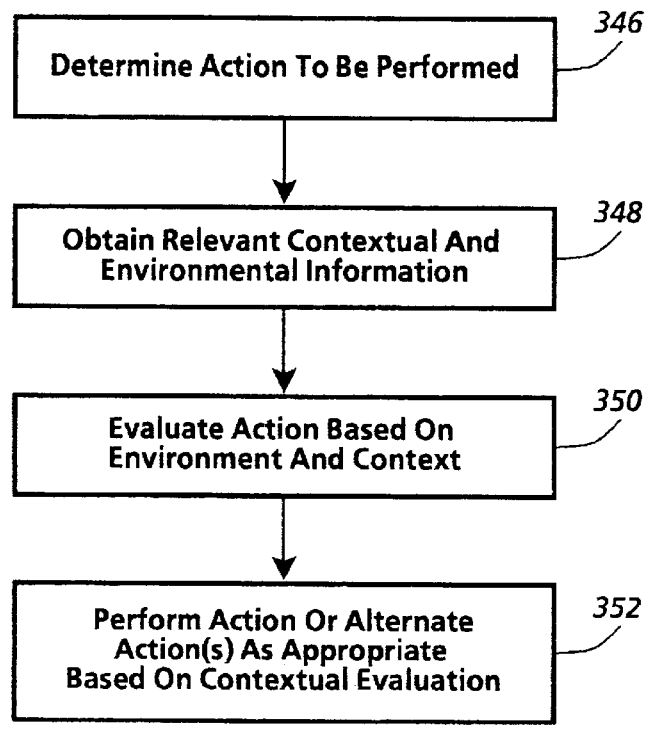
FIG. 13 describes in general terms the use of context information in decision-making.
Figure 14:
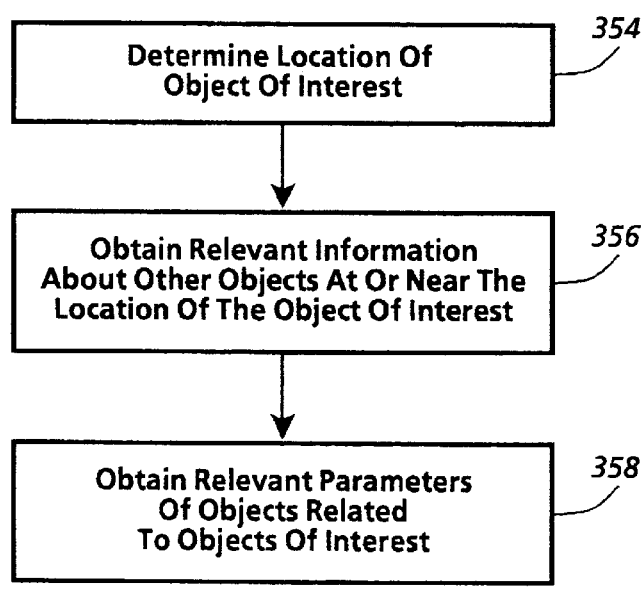
FIG. 14 describes in general terms the retrieval of contextual information.

FIGS. 13 and 14 describe how the current context and surrounding environment of objects involved with a desired action affect the performance or outcome of the action.

FIG. 13 describes in general terms the use of context information in decision-making. These steps may be performed by any process in the system that needs to perform context-sensitive actions, including both individual applications as well as agent processes (i.e., user agents and device agents).

Some steps may be performed by different processes; for example, an application may hand a task off to a UserAgent or DeviceAgent at some point, in which case some of the decision-making is done by the application process and some by the agent process. Some actions may also involve the participation (and hence decision-making) of multiple agents.

The step in box 346 determines the action to be performed. This may be based on a request from another application or agent, or may be triggered by a change in state or context of the system. The step in box 348 obtains contextual information, i.e., information relevant to the action, from the appropriate sources. Such sources might be the Location Service or Name service, other agents or applications. Relevant contextual information may be retrieved as shown in FIG. 14.

In FIG. 14, the step in box 354 obtains location information for any physical objects, either users or devices, directly involved with the desired action. Location information may include both point location and extent (dimensions) of the object of interest. In most cases, either the location of the object is already known (e.g., if a UserAgent wants to perform an action relating to its user) or may be determined by asking the associated agent process (e.g., asking the DeviceAgent of a particular device of interest). For objects that have no associated agents, the Location Service can be asked for their location.

The step in box 356 obtains information about other objects that are at or near the locations of the objects of direct interest to an action. This may be done by querying the Location Service for information about what is located at the relevant locations. Alternatively, if a standing query is already in place to obtain information about the desired locations, then the relevant information will already be at hand. For example, a user agent registers a standing query for the location that its user is currently at. Hence it will stay continually informed of what other objects are currently near its user. Should the UserAgent need to perform some action pertaining to its user, it will already know both its user's location as well as what other objects are nearby.

The step in box 358 obtains relevant parameters for the objects of direct interest, and for appropriate objects related to the objects of direct interest. For some objects the relevant information may be contained directly in the registrations they have made in the Location Service—implying that it will be available as part of the results from the step in box 356. For the remaining objects the information will have to be obtained by asking their respective agent processes for it. This information may include the current states of users and devices—for example, whether or not a particular lamp in the location is turned on, the color map entries of the Terminal Agent controlling a particular display terminal, knowing whether some user is currently "busy" or "free," and knowing the identities of all users at a particular location.

The step in box 358 may also obtain relevant policy values for various objects. This information will determine what actions and states are acceptable or unacceptable for various devices and locations. For example, a meeting room profile may specify that telephone calls may not be forwarded to that location if a meeting is in progress. Personal profile information of various user agents may indicate the preferences of individuals in the environment of the object of the interest. Device profiles may indicate ownership and/or capabilities of nearby devices.

If environmental information is available for any location of interest to an action, this information may also be gathered, as described in step 348. In the present embodiment, some location-specific environmental information is also maintained in a separate Environment Server that maintains building-specific environmental information indexed by location.

Returning to FIG. 13, the step in box 350 evaluates the action to be performed based on the contextual and environmental information obtained in box 348. This evaluation may include determining if an action is allowed under present context, or is appropriate for the situation.

The step in box 352 performs appropriate actions based on the evaluation of step 350. Depending upon the context, this may include performing the originally requested action, modifying the action or performing a different action, or denying or delaying the action.

D. Applications

The following figures describe particular applications of the techniques and components described above.

Figure 15:
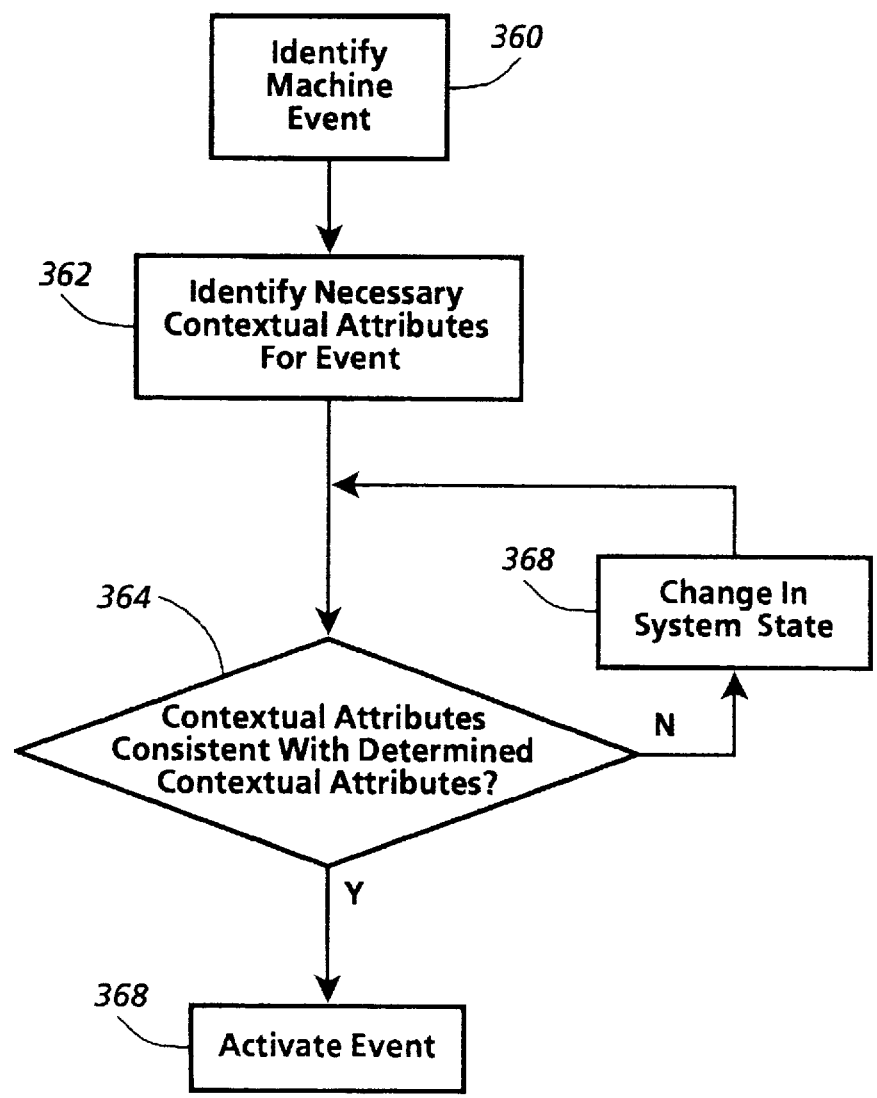
FIG. 15 describes a method for selectively activating a machine event, based on the context of the machine and proximity of users.

FIG. 15 describes a method for selectively activating a machine event, based on the context of the machine and proximity of users. In the step box 360, the desired machine event is identified. As an example, a user$_A$ wishes to send a private document to the nearest available printer.

In the step in box 362, selected contextual attributes which are necessary for the event to take place are identified. In the example, because the document user$_A$ is sending is private, she only wants it to print when she is standing nearby, and the printer must be of a type that can handle the graphics she has embedded in her document. Further, she does not want it to print when there is anyone else there.

The step in box 364 essentially waits for the system to reach the desired context. For the example, UserAgent$_A$ will track user$_A$'s whereabouts, obtaining information from the Location Service about nearby printers whenever the Location Service notifies UserAgent$_A$ of a change in user$_A$'s location (or if user$_A$ does not wish to be registered in the Location Service, the the UserAgent$_A$ simply queries the Location Service about the location that user$_A$ moves to). Other contextual information necessary to perform the action will then be retrieved and checked, as well. Some of this information may come from the Location Service, and some may come from individual agents themselves. As mentioned above, this could include determining another user or users being within proximity to the named printer, the proximity of user$_A$ to the printer, or the current busy state of the printer. The system may perform many other steps while waiting for the desired contextual attributes for a particular event to occur.

When the system has reached the desired context, the step in box 366 activates the event. In the discussed example, when user$_A$ is alone in proximity to the nearest capable printer, the specified document is printed. In addition to the steps shown, the user may also receive status messages from the DeviceAgent of the printer while the document is queued to print, or where the printer is located.

Figure 16:
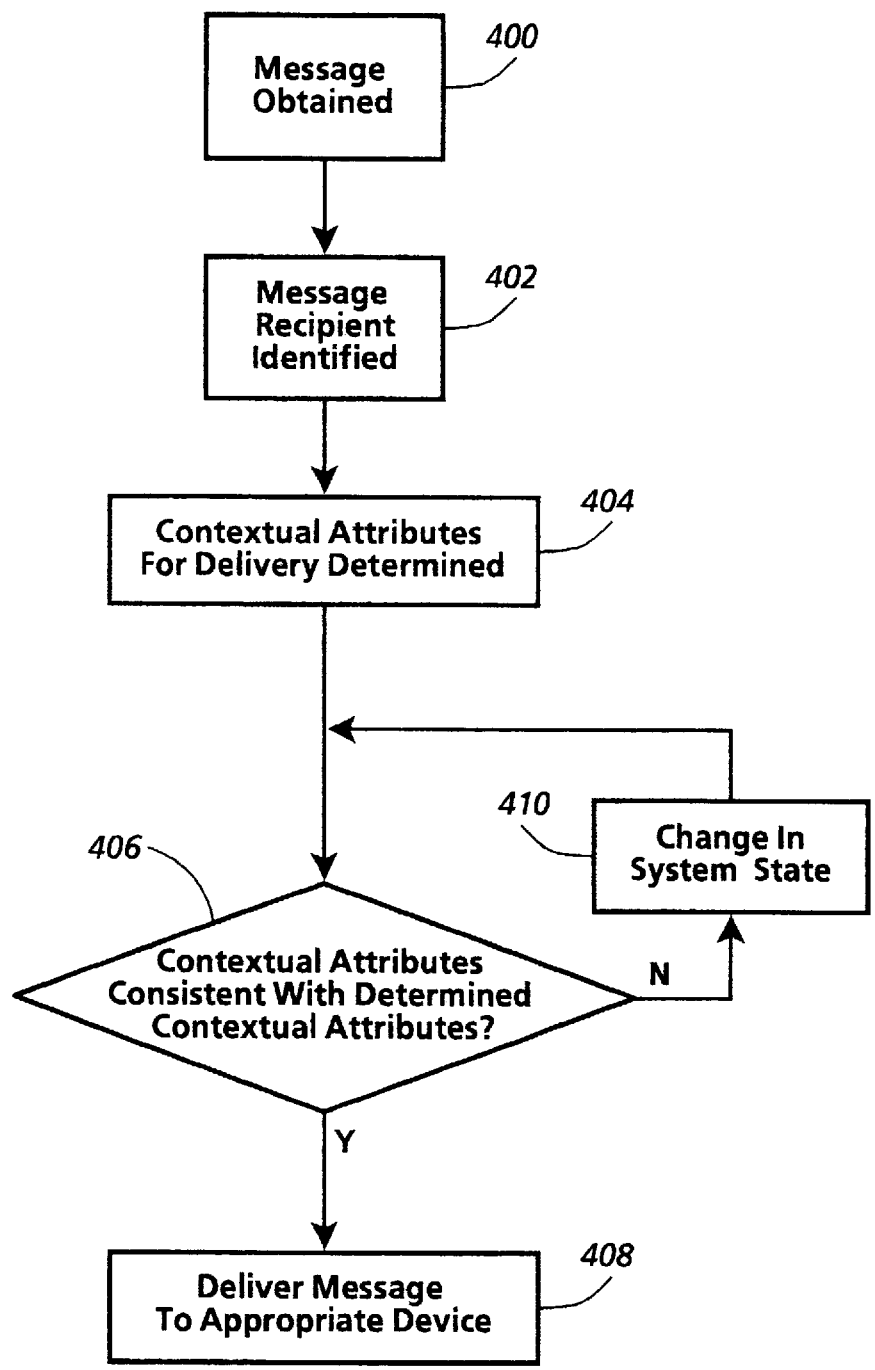
FIG. 16 describes in general terms a method for selective electronic message delivery.

In an example of the application of selective electronic message delivery, illustrated by FIG. 16, user$_A$ may wish to receive a message reminding him of a meeting with user$_B$. The message may be specified in the step in box 400. In the case of a user requesting a reminder message, the user would be the recipient in the step in box 402. User$_A$'s reminder request may, for example, further specify that in addition to sending an electronic message a few minutes before the scheduled meeting, other attributes may affect the delivery of the message. For example, user$_A$ may not wish to have the reminder sent if there are other people present in proximity to his display device, say in his office. On the other hand, he may wish to be reminded immediately if he is in proximity to user$_B$ within a half hour of the scheduled meeting. If other identifiable users are present, however, he may not want the message delivered until he is alone with user$_B$. For the example, in the step in box 404, user$_A$ specifies that the reminder is to be sent a 15 minutes before the scheduled meeting time, and/or when he is in proximity to user$_B$ within half an hour of the meeting, and only particular other users may be in proximity to user$_A$ when the message is delivered. User$_A$'s personal profile and policies may further specify that calendar-type messages be displayed when possible on the smallest display device available.

The step in box 406 then finds the context of the user$_A$, including the available display devices, the profiles of those devices, and other users present, as described in relation to FIG. 14. When the contextual attributes of the system are consistent with those specified by user$_A$, the message is delivered, as appropriate, in the step in box 408.

In the example above, user$_A$ enters a room 25 minutes before the scheduled meeting with user$_B$, to find user$_B$ in the room with two other users, trusted members of their team. If the other users have been specified as allowed (or alternately, have not been specified as not allowed) to be present for delivery, the message may be delivered immediately to an appropriate device. If the user is carrying a personally registered Tab, the message may be displayed by the Tab or may be sent to some other available device in proximity to user$_A$ which satisfies the attributes of the profile of user$_A$ and the priority and attributes of the message.

Figure 17:
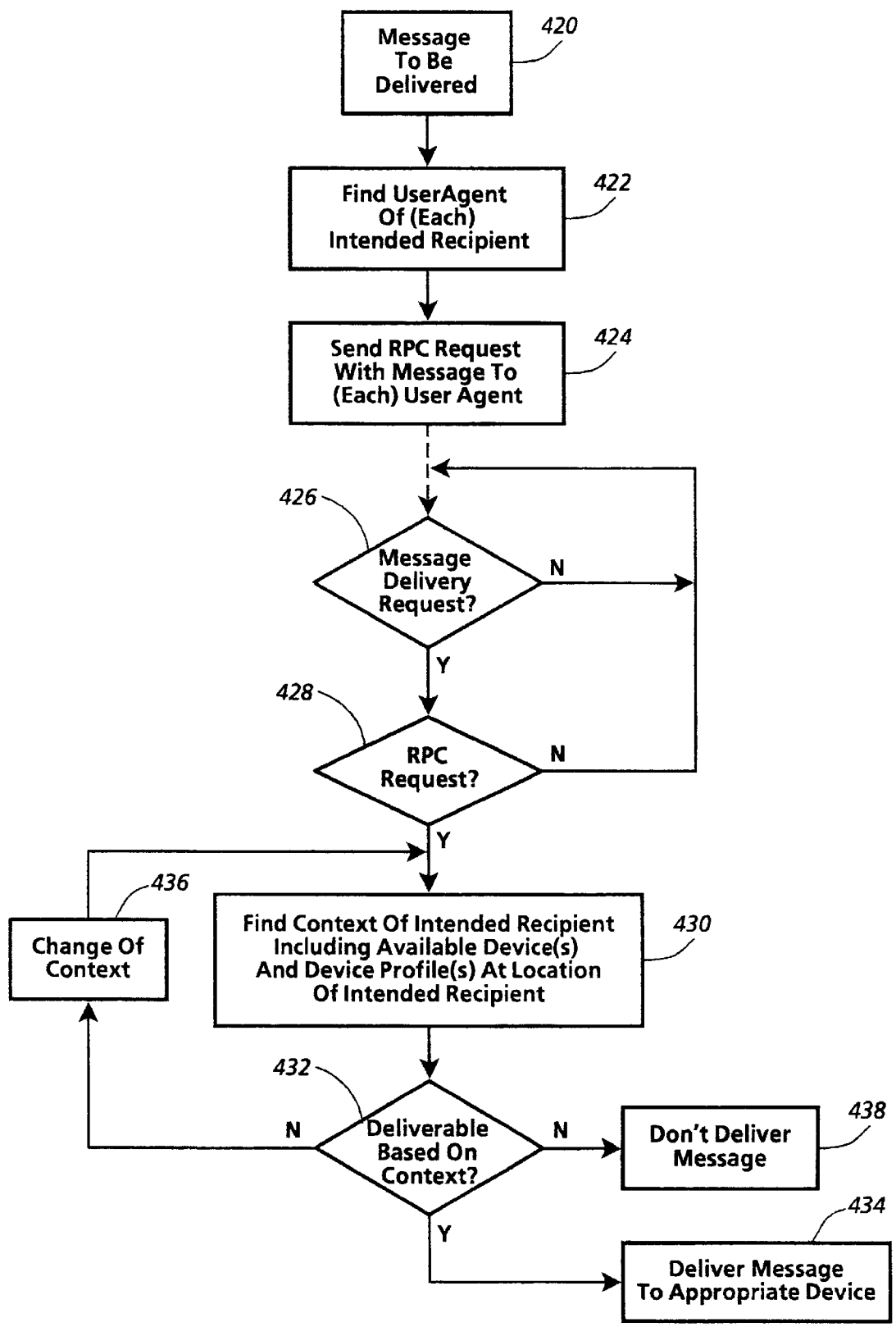
FIG. 17 describes in more detail a method for selectively delivering electronic messages to one or more users.

FIG. 17 describes in more detail the method for selectively delivering electronic messages to one or more users wherever they currently are, via the ubiquitous computing environment herein described. Such a message might be an electronic mail message, an electronic reminder (from a calendar or timer), or a message produced directly by a "send-message-to-user-now" application. In the former two cases there must be some kind of server process running that can take electronic mail messages or reminder messages and execute the steps of FIG. 17 with them. In the last case, the application program itself may perform the first three steps of FIG. 17.

In the step in box 420, a message is obtained for delivery to some specified set of users. The message may have been obtained from the input to an application program, or it may have been obtained from a mail or calendar system by a server process dedicated to the task of translating the mail or calendar data into messages that can be delivered as described. As an example, a user$_A$ wishes to send a private electronic message to user$_B$. In the step in box 422 the set of recipient users is mapped to a set of UserAgents representing them. This is done by looking up the users' names in the Name Service to obtain the RPC addresses of their corresponding UserAgents. In the example described above, UserAgent$_A$ finds the name and RPC address of UserAgent$_B$.

In the step in box 424, the message to deliver is sent to the respective user agents in RPC requests that indicate the contextual attributes for the message delivery. For example, the priority level may indicate that the accompanying message should be delivered to the user$_B$ as soon as possible, or may indicate that the accompanying message is private.

Steps 426–438 describe the actions of a UserAgent$_B$ receiving a message to deliver. In the step in box 426, the recipient UserAgent$_B$ receives an RPC request, the step in box 428 checks for an electronic message. Box 426 corresponds to box 126 and 128 in FIG. 4.

The step in box 430 examines the current state and context of the user$_B$, including the available display devices at the user$_B$'s current location. Some display devices may be present at the location but unavailable because of their own current state, for example. The recipient UserAgent$_B$ also examines the profile and policy information it has for the user. For example, user$_B$ may wish to receive the message immediately if it is coded urgent, but only on a small associated Tab if the message is private and there are other people in near proximity.

The step in box 432 evaluates the message based on the context of the recipient and the priority of the message, and may determine a display property which indicates how a message should be delivered, if at all. Some display devices may be available, but inappropriate for displaying the message because of the sensitivity of the message. More than one display device may be available—for example, if the intended recipient has access to both a workstation and a Tab. In this case, the message is delivered to the most appropriate device, where appropriateness depends on the device characteristics, the context, and the message characteristics. In the example described above, if user$_A$ has specified that the some particular other users may be present, the message may be delivered to user$_B$ even when those other users are in proximity to user$_B$. UserAgent$_B$ will determine the location of user$_B$ and the devices nearby, and may deliver the message to user$_B$ by a Tab (using the Tab's device agent), or through another device that may be in proximity to user$_B$.

If the evaluation determines that the message delivery is not appropriate at the present time, the application may wait for a change in context of the user in the step in box 436 before reattempting delivery. In the above example, the message may not be delivered until other users with user$_B$ have left.

If a message is prioritized such that delayed delivery is of no importance, the system may simply discard the message in the step in 438.

As described above, a user may specify that when other people are present only messages of high priority should be delivered, and should be delivered in prescribed ways. Personal or private messages may be directed only to small personally held devices registered to the user, such as a Tab or owned Pad device. It may be specified that an alert delivered to the nearest available display device when an urgent priority message is waiting, while the actual message is delivered to a more personal device or back at the user's office workstation. A message may be delivered immediately to a workstation when the user is alone in the office with it, but may be delayed if there are other persons present.

Figure 18:
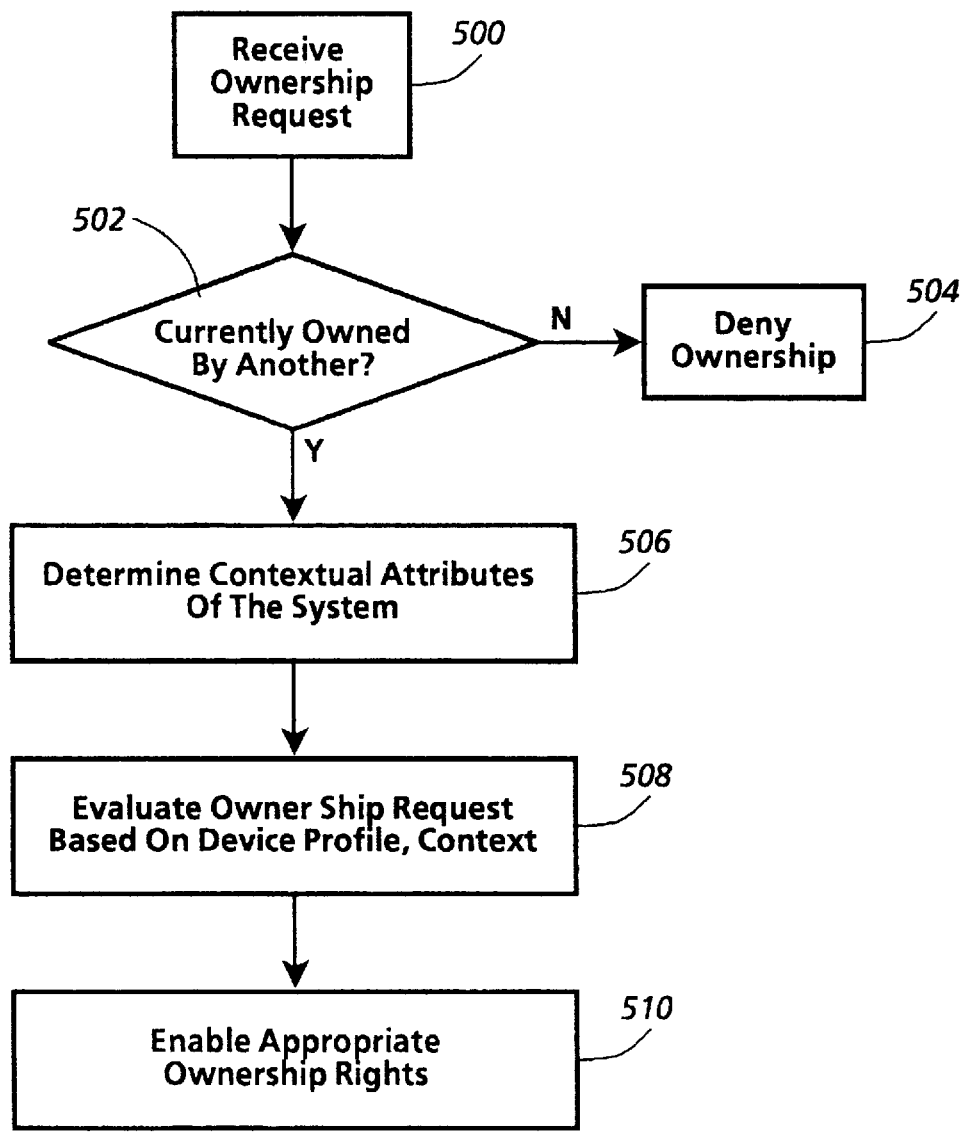
FIG. 18 describes the establishment of ownership over particular devices based on context including environment and proximity.

FIG. 18 describes the establishment of ownership over particular devices based on context including environment and proximity. This technique is performed by a Device Agent for a particular device. Ownership of a device may comprise exclusive or partial control of the resources of the device. For example, ownership of a small device, such as a Tab, may be by default exclusive, since it may not have the capabilities to perform operations for more than a single user at a time. A large device such as a Board, however, has the capability to display numerous windows and applications, and may only allocate ownership of a portion of its resources to any one user. Other devices, such as those providing shared information tailored to the profiles of users in close proximity to the device, may share ownership and mediate between the needs and desires of a number of users at one time. Some devices may belong to particular users—a workstation in an office, for example, may be thought of as belonging to the user who resides in that office. Such ownership privileges may allow the user highest priority for controlling the resources of that workstation. Other devices may allow only short term, temporary ownership before reverting back to an unowned, public state.

In the step in box 500, the Device Agent receives an ownership request. Such a request is made explicitly by a UserAgent. The UserAgent may have generated the request in response to an explicit command of the user, or implicitly—because the user's policy specifies that ownership control should be taken of available proximate devices of the type of the device, for example. The step in box 502 checks the current ownership status of the device. If it is currently exclusively owned by another, the step in box 504 denies ownership. Alternatively, the device may ask the previous owner to relinquish ownership, check for recent usage and end ownership if not recently used, or perform other operations relating to ownership of the device.

The step in box 506 determines the context of the device, as described in relation to FIG. 13. The step in box 508 then evaluates the ownership request based on the context, the device profile, and perhaps the user's identity. The step in box 510 then enables the appropriate ownership rights. These rights may be all or a subset of the rights initially requested, depending on the evaluation. For example, a user picking up an unowned Pad may be given full access rights to the system and memory of the device. A workstation, however, may allow some users full access, and other users access only to certain subsystems, perhaps allowing mail functions at that workstation, but not allowing access to stored files.

Figure 19:
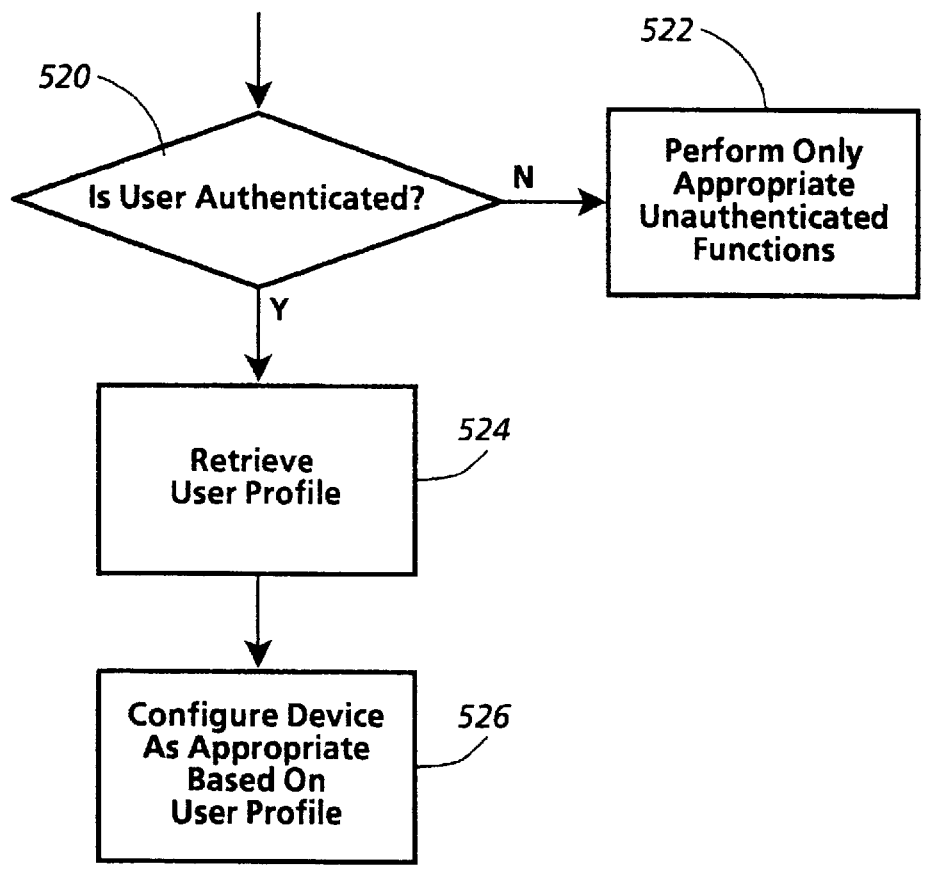
FIG. 19 describes user authentication for establishment of ownership of devices.

The step in box 510 may require user authentication and a login procedure, as further described by the flowchart shown in FIG. 19. The DeviceAgent controlling the device may check for authentication in the step in box 520. Such identity and authentication information may be contained in a user's Active Badge, or some other personal authentication device. Alternatively, handwriting or speech recognition may be used to authenticate the user, depending upon the device. Any device may employ multiple means of establishing authentication. If the owner cannot be authenticated, the device may allow the user to access public data available through the appropriate distributed network in the step in box 522.

If a device is able to identify and authenticate the owner, automatic login procedures may be initiated, depending on the device profile and the ownership request. The step in box 524 retrieves the UserProfile fragment for the authenticated user. This can be done in a variety of ways; for example, by including the profile information as part of a login RPC exchange. The User Profile may specify preferred customization properties for the device. For example, the user may desire a mail window to be retrieved automatically and displayed upon login to a device, such as a Pad, or an entire electronic desktop be retrieved for display on a workstation.

When a login is initiated on a device, the step in box 526 configures the device as appropriate according to the device and the UserProfile. A specific computing environment, such as an electronic desktop, may be retrieved using data from the user's UserProfile. Devices may, in this manner, be automatically customized to match the personal preferences of the computing environment of an authenticated user.

Figure 20:
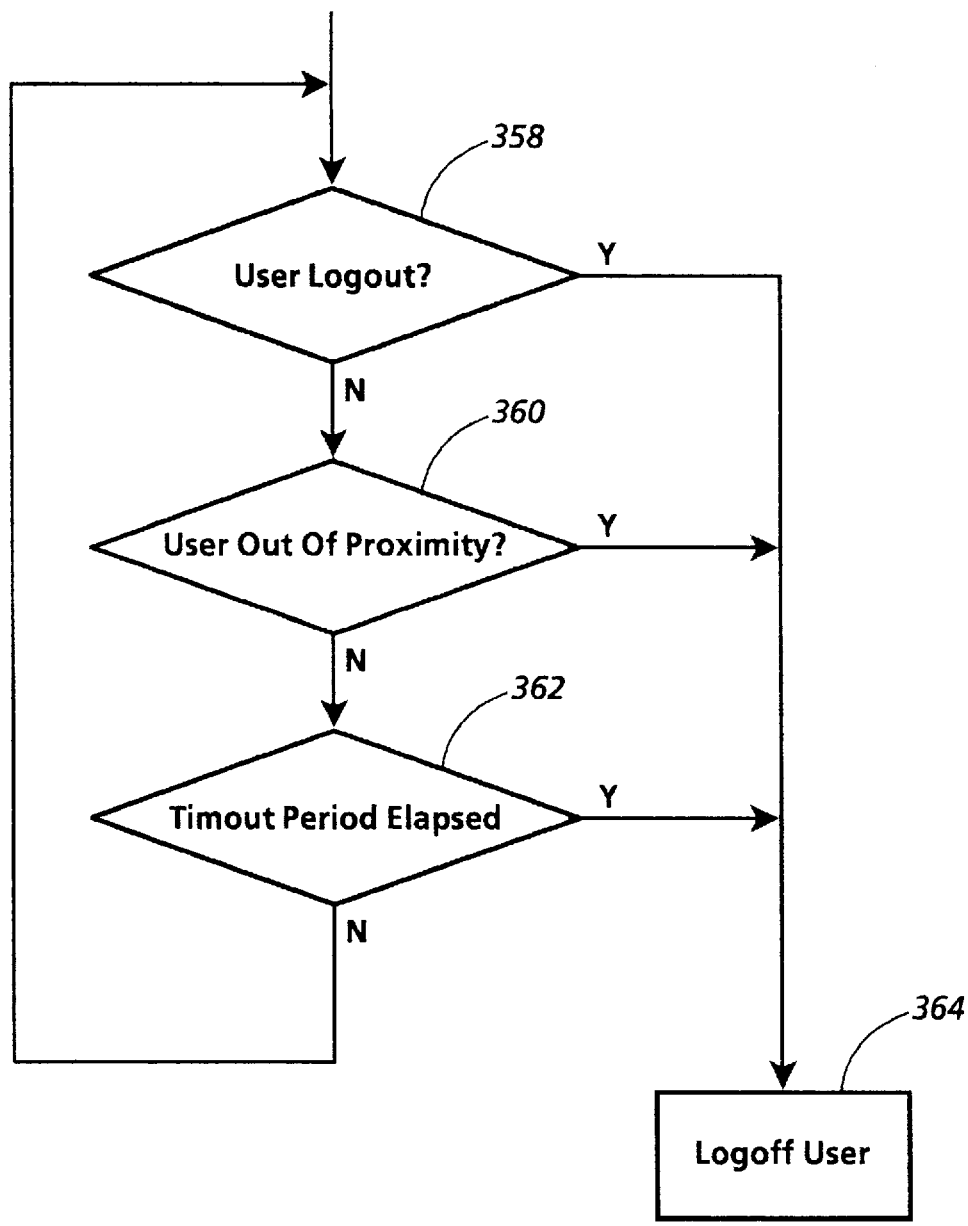
FIG. 20 describes automatic logout procedures for temporary owners of devices.

As shown in FIG. 20, automatic logout procedures may further be performed by the device. The user may explicitly specify a logout procedure via RPC request in the step in box 528. If the device supports the appropriate input capabilities, the logout may also be done using written or voice-recognized commands.

A way to automatically log users out is depicted in the step in box 530. When the user is out of the prescribed proximity of the device, logout is initiated. This may involve the system receiving a callback from the Location Service indicating that the user has moved.

Another means of automatic logout is depicted in the step in box 532. The elapsed time since the last user operation is checked. If a "time-out" period, which may be specified by the user, has elapsed, the system may logoff the user. For example, if a user was identified and authenticated by a Tab which is left in proximity to the device when the user has left (and forgotten the Tab), the device would, after the timeout period, log itself off, requiring reauthentication of the user.

Which of the above-described automatic logout techniques is enabled, if any, depends on the device profile and perhaps on the parameters specified as part of the login procedure.

Figure 21:
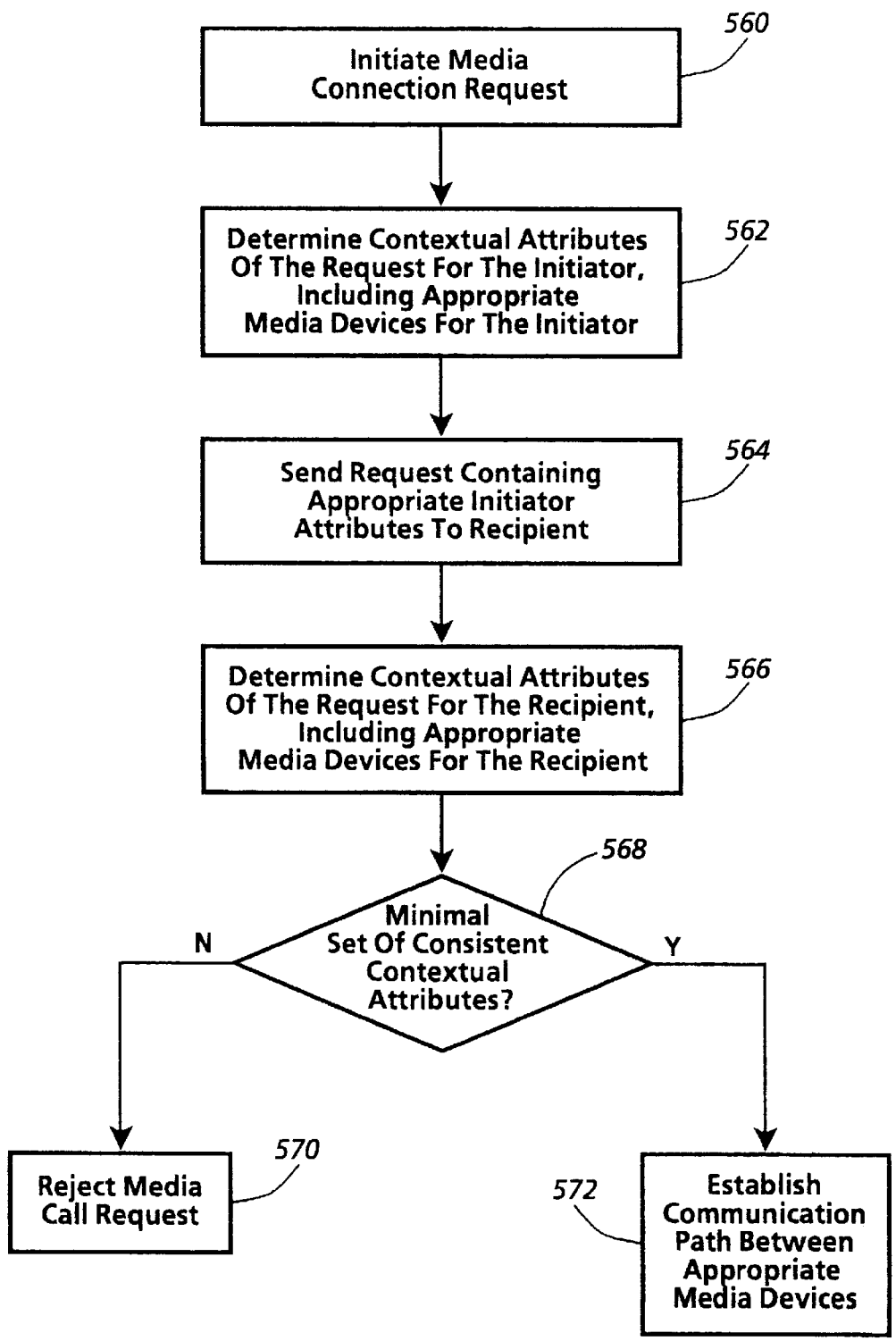
FIG. 21 illustrates a general method of selectively establishing communications paths between media devices based on the context of the users.

FIG. 21 illustrates a general method of selectively establishing communications paths between media devices based on the context of the users. In the step in box 560, a media request is initiated by an initiator. The step in box 562 determines contextual attributes for the initiator's side of the communications path. In this case, the attributes may include a list of media devices available to the initiator, a list of media connection types acceptable to the user, who the recipient is and what state conditions must be met by the recipient (i.e., alone, in an office). For example, $user_A$ may wish to set up an electronic conference with $user_B$. $user_A$ may specify that a video connection is preferred, perhaps on a particular machine in $user_A$'s office, unless $user_B$ has other people in proximity. $user_A$ may also accept telephone, or voice only, connection.

The request is sent by the UserAgent of the initiator $user_A$ to the UserAgent of the recipient $user_B$ in the step in box 564. The request may contain related information such as the $user_A$'s specified list of acceptable connections, the addresses of the device agents for the acceptable devices, or state information that may be of interest to $user_B$ in determining what kind of connection to accept.

The step in box 566 determines contextual attributes for the recipient's side of the communications path. Again, the attributes may include a list of media devices available to $user_B$, or a list of media connection types acceptable to $user_B$. $user_B$ may be queried about acceptable connections. The user profile and policies of $user_B$ may also be determined with respect to the media connection request.

The step in box 568 determines if there is a match between the connection specifications of the initiator and recipient. If both the initiator and recipient have allowed a similar connection type, the step in box 572 establishes a communications path between appropriate devices for the "best" connection possible. In the example above, if $user_B$ will accept either telephone or video connections as well, then $user_A$'s preferred video connection would be established as the "best" connection possible. If, on the other hand, $user_B$ will accept only direct net or telephone connections, then a telephone connection will be determined to be the "best" connection possible under the current context. If $user_A$ had specified merely that a telephone connection was not acceptable, and $user_B$ would accept only telephone connections, then the media connection request would be rejected in the step in box 570.

The communication path established in the step in box 572 may be set up directly between the media devices through the DeviceAgents controlling each device. Once the connection is established, the UserAgents would no longer be involved.

Alternatively, the communication path between the devices may continue to be under the control of the UserAgents, each UserAgent communicating with its user's device and with other user agents. UserAgents may then monitor or control the communication channel, for example, storing communicated information for a user during certain states, and delivering the information when state changes occur. For example, a $user_A$ watching a video of an event may not wish to get the video information if another user is present in proximity to the $user_A$. The information may be stored by $UserAgent_A$, and delivered when $user_A$ is alone again.

Figure 22:
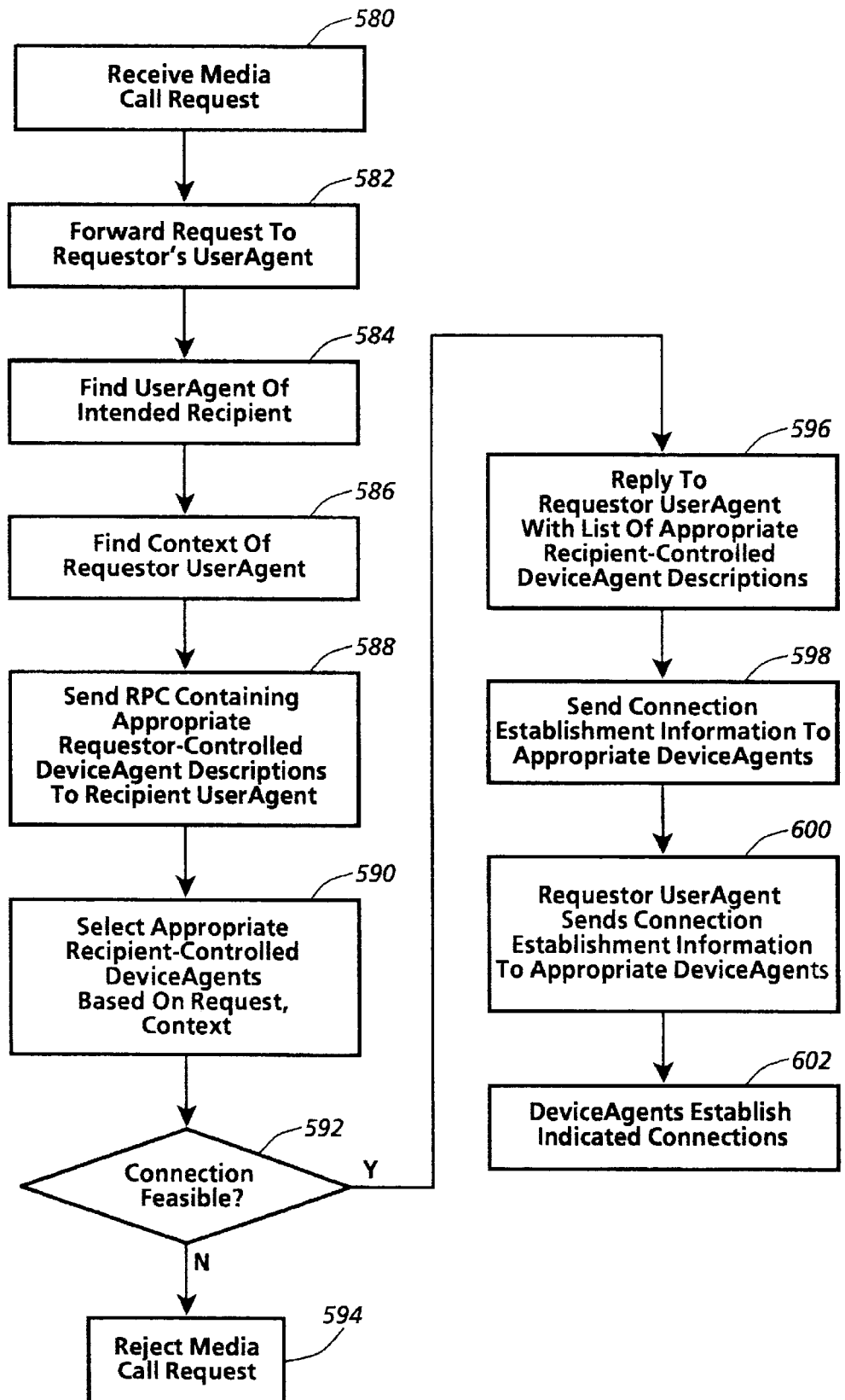
FIG. 22 describes in more detail a method for connecting a user with other users via media devices, especially when multiple devices are available.

FIG. 22 describes in more detail a method for connecting a user with other users via media devices, especially when multiple devices are available. Media connection choices may include video, audio and teletype connections. Users may specify policy constraints that control which kinds of connections may be established under various circumstances. These policy specifications may be made in the user profile, or explicitly by the user for temporary short-term conditions.

The step in box 580 receives a media call request. This step typically would be performed by an application program used to request the call. The request is sent to the requestor's UserAgent. The request contains the name of the desired recipient as well as an indication of what kind of connection the requestor would like or accept. For example, the requestor may specify a video connection on the request side, and willingness to take any level of connection that the recipient offers.

Steps 584–588 in FIG. 22 are performed by the requestor's UserAgent. The step in box 584 finds the User Agent of the intended recipient. The step in box 586 finds the context of the requestor. This determines on which devices the requestor is willing to have a media call connection established on his side. The step in box 588 sends the descriptions (including RPC addresses) of the Device Agents representing devices that the requestor User Agent is willing to use for its side of the media call. For example, it might send the RPC address of the TerminalAgent controlling a video camera and display for a workstation the requester is currently using. It might also send addresses of the agents of the microphone and speaker of the workstation, if those devices are managed separately.

Steps 592 and 594 of FIG. 22 describe actions of the recipient's UserAgent. In the step in box 590, the appropriate recipient-controlled DeviceAgents are selected, based on the requested service and the context of the UserAgent. For example, the recipient UserAgent may have specified that only audio calls be allowed under certain contextual conditions, implying that even if a video connection could be made or was requested, video should not be considered under those conditions. If a connection between compatible devices listed for the requestor and allowed by the recipient can be established, then the recipient UserAgent proceeds to the step in box 596. Otherwise, it rejects the media call request in the step in box 594.

In the step in box 596, the recipient UserAgent replies to the requestor's UserAgent with the description of the DeviceAgent it wants to use for its side of the media call connections. In the step in box 598, it then sends appropriate connection establishment information (via RPC requests) to each of the DeviceAgents on its side that it selected for the media call. This information typically includes the RPC address of the corresponding DeviceAgent to connect to on the other side, and may also include some amount of authentication information pertaining to the recipient UserAgent, the requester UserAgent, or the other DeviceAgent. The step in box 600 is the same as step 598, except taken by the requestor UserAgent. The step in box 602 represents each pair of Device Agents sending RPCs to form a connection.

For multiple recipients, UserAgent$_A$ may establish the "best" allowed connection with each recipient. In such a case, each connection between user$_A$ and another recipient may be different, depending on the policies and context of each recipient.

Alternatively, the "best" connection for a group communication may be limited to the best connection possible for all the involved recipients.

E. Miscellaneous

The system described in the present embodiment does not comprehensively consider fault tolerance issues. Various single points of failure, such as the Location Service and the Name Service, may be fortified in order to allow the system to function properly a greater percentage of the time. Known techniques such as replication could be used to make any of the agents or applications running in the system more fault tolerant.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A computer implemented method for establishing a media connection between at least a first user and a second user in a system of multiple devices and multiple users, the system supporting a multiplicity of media connections, each device supporting at least one type of media connection, some of said multiple devices being personal and others of said multiple devices being public, wherein the location of each device and user may be determined by the system based on the context of the system, the method comprising the computer implemented steps of:

a) receiving from said first user a media connection request that does not specify the media format and device to be used;

b) determining media devices in close proximity to a location of said first user and the type of media connection supported by each media device in close proximity to the location of said first user;

c) determining first user properties including first user preferences for types of media connections;

d) identifying said second user;

e) determining a location for said second user;

f) determining media devices in dose proximity to the location of said second user and the type of media connection supported by each media device in close proximity to the to the location of said second user;

g) determining second user properties including second user preferences for types of media connections; and h) determining a media connection type consistent with said first user properties and second user properties.

2. The method of claim 1, further comprising selecting a first media device in close proximity to said first user based upon said first user properties, said first media device being capable of providing said media connection type;

selecting a second media devices in close proximity to said second user based upon said second user properties, said second media device being capable of providing said media connection type; and establishing connection between said first and second media devices.

3. The method of claim 1, further comprising rejecting said media connection request when said media connection type can not be provided by said media devices in close proximity to said second user.

4. A computer implemented method for performing a media event initiated by a first user in a system of multiple devices and multiple users, the system being capable of performing a multiplicity of media events, each of the multiple devices being capable of performing at least one media event, some of said multiple devices being personal and others of said multiple devices being public, wherein the location of each device and user may be determined by the system, based on the context of the system, the method comprising the computer implemented steps of:

a) receiving from said first user a media event command that does not specify a media connection type and media device to be used;

b) determining first user properties including information indicating first user preferences for media device and first user preferences for types of media connection;

c) determining a media connection type consistent with said first user preferences and said media event command;

d) determining a particular media device for performing said media event based on said first user properties, said media connection type, and proximity to a location of a second user; and e) performing said media event.

5. The method of claim 4, wherein said first user properties further include a location of said first user a preference for proximity to a media device performing said media event.

6. The method of claim 4, wherein said first user properties further include a location preference for a media device for performing said media event.

* * * * *